(12) United States Patent
Klasen-Memmer et al.

(10) Patent No.: US 7,989,035 B2
(45) Date of Patent: *Aug. 2, 2011

(54) LIQUID CRYSTALLINE MEDIUM

(75) Inventors: Melanie Klasen-Memmer, Heuchelheim (DE); Sabine Schoen, Herten (DE)

(73) Assignee: Merck Patent GmbH, Darmstadt (DE)

( * ) Notice: Subject to any disclaimer, the term of this patent is extended or adjusted under 35 U.S.C. 154(b) by 139 days.

This patent is subject to a terminal disclaimer.

(21) Appl. No.: 11/631,182

(22) PCT Filed: Jul. 1, 2005

(86) PCT No.: PCT/EP2005/007128
§ 371 (c)(1),
(2), (4) Date: Dec. 29, 2006

(87) PCT Pub. No.: WO2005/807128
PCT Pub. Date: Jan. 12, 2006

(65) Prior Publication Data
US 2008/0308768 A1 Dec. 18, 2008

(30) Foreign Application Priority Data
Jul. 2, 2004 (DE) .................. 10 2004 032 326

(51) Int. Cl.
*C09K 19/30* (2006.01)
*C09K 19/12* (2006.01)
(52) U.S. Cl. ................ 428/1.1; 252/299.63; 252/299.66
(58) Field of Classification Search ............. 252/299.01, 252/299.63, 299.66; 428/1.1
See application file for complete search history.

(56) References Cited

U.S. PATENT DOCUMENTS

| | | | |
|---|---|---|---|
| 5,599,480 A | 2/1997 | Tarumi et al. | |
| 6,217,953 B1 | 4/2001 | Heckmeier et al. | |
| 6,740,369 B2 * | 5/2004 | Klasen-Memmer et al. | .. 428/1.1 |
| 6,764,722 B2 * | 7/2004 | Klasen et al. | ............... 428/1.1 |
| 6,764,723 B2 * | 7/2004 | Lee et al. | ................. 428/1.1 |
| 6,933,022 B2 * | 8/2005 | Klasen-Memmer et al. | .. 428/1.1 |
| 7,026,022 B2 * | 4/2006 | Klasen-Memmer et al. | .. 428/1.1 |
| 7,371,437 B2 * | 5/2008 | Klasen-Memmer et al. | .. 428/1.1 |
| 7,582,337 B2 * | 9/2009 | Klasen-Memmer et al. | .. 428/1.1 |
| 7,785,677 B2 * | 8/2010 | Klasen-Memmer et al. | .. 428/1.1 |
| 7,854,970 B2 * | 12/2010 | Klasen-Memmer et al. | .. 428/1.1 |
| 2001/0010366 A1 | 8/2001 | Heckmeier et al. | |
| 2002/0014613 A1 | 2/2002 | Klasen-Memmer et al. | |
| 2002/0084443 A1 | 7/2002 | Heckmeier et al. | |
| 2003/0006399 A1 | 1/2003 | Reuter et al. | |
| 2003/0039769 A1 * | 2/2003 | Lee et al. | ................. 428/1.1 |
| 2003/0222245 A1 * | 12/2003 | Klasen-Memmer et al. | ............. 252/299.66 |
| 2004/0099842 A1 * | 5/2004 | Klasen-Memmer et al. | ............. 252/299.62 |
| 2004/0146662 A1 * | 7/2004 | Klasen-Memmer et al. | .. 428/1.1 |
| 2005/0121647 A1 | 6/2005 | Klasen-Memmer et al. | |

FOREIGN PATENT DOCUMENTS

| | | |
|---|---|---|
| DE | 101 12 955 A1 | 11/2001 |
| DE | 102 18 976 A1 | 12/2002 |
| WO | WO 2004/048500 * | 6/2004 |

* cited by examiner

*Primary Examiner* — Shean C Wu
(74) *Attorney, Agent, or Firm* — Millen, White, Zelano & Branigan, P.C.

(57) ABSTRACT

The present invention relates to a liquid-crystalline medium based on a mixture of polar compounds having negative dielectric anisotropy ($\Delta\epsilon$), which is distinguished by the fact that it has a value for the ratio $\gamma_1/\Delta n^2$ in the range 6-45 with a clearing point of >60° C. and a $\Delta\epsilon$ of $\leq$-2.3. Media of this type are particularly suitable for electro-optical displays having active-matrix addressing based on the ECB, PA LCD, FFS or IPS effect.

27 Claims, No Drawings

LIQUID CRYSTALLINE MEDIUM

The present invention relates to a liquid-crystalline medium and to the use thereof in liquid-crystal displays, in particular liquid-crystal displays addressed by means of an active matrix (AMDs or AMLCDs for active matrix addressed liquid crystal displays). Particular preference is given to displays which use an active matrix comprising thin-film transistors (TFTs) or varistors. AMDs of this type can use various active electronic switching elements. The most widespread are displays which use three-pole switching elements. Examples of three-pole switching elements of this type are MOS (metal oxide silicon) transistors or the above-mentioned TFTs or varistors. Various semiconductor materials, predominantly silicon, or also cadmium selenide, are used in the TFTs. In particular, polycrystalline silicon or amorphous silicon is used. In contrast to the three-pole electronic switching elements, matrices of two-pole switching elements, such as, for example, MIM (metal insulator metal) diodes, ring diodes or back-to-back diodes, can also be employed in AMDs.

In liquid-crystal displays of this type, the liquid crystals are used as dielectrics whose optical properties change reversibly on application of an electrical voltage. Electro-optical displays which use liquid crystals as media are known to the person skilled in the art. These liquid-crystal displays use various electro-optical effects.

The most widespread conventional displays use the TN effect (twisted nematic, having a nematic structure twisted by about 90°), the STN effect (supertwisted nematic) or the SBE effect (supertwisted birefringence effect). In these and similar electro-optical effects, liquid-crystalline media having positive dielectric anisotropy ($\Delta\epsilon$) are used.

In contrast to the said conventional displays, which require liquid-crystal media having positive dielectric anisotropy, there are other electro-optical effects which use liquid-crystal media having negative dielectric anisotropy, such as, for example, the ECB effect (electrically controlled birefringence) and its subforms DAP (deformation of aligned phases), VAN (vertically aligned nematics), MVA (multidomain vertical alignment), ASV (advanced super view), PVA (patterned vertical alignment) and CSH (colour super homeotropics).

The principle of electrically controlled birefringence, the ECB effect (electrically controlled birefringence) or also DAP effect (deformation of aligned phases), was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio of the elastic constants $K_3/K_1$, high values for the optical anisotropy $\Delta n$ and values for the dielectric anisotropy $\Delta\epsilon$ of −0.5 to −5 in order to be usable for high-information display elements based on the ECB effect. Electro-optical display elements based on the ECB effect have a homeotropic edge alignment.

The IPS effect (in plane switching) increasingly employed recently can use both dielectrically positive and also dielectrically negative liquid-crystal media, similarly to "guest/host" displays, which can employ dyes, depending on the display mode used, either in dielectrically positive or in dielectrically negative media. A further highly promising type of liquid-crystal displays are so-called "axially symmetric microdomain" (ASM for short) displays, which are preferably addressed by means of plasma arrays (PA LCDs from "plasma addressed liquid crystal displays").

The liquid-crystal media employed in the above-mentioned liquid-crystal displays and in all liquid-crystal displays utilising similar effects generally comprise liquid-crystal compounds having the corresponding dielectric anisotropy, i.e. comprising compounds having positive dielectric anisotropy in the case of dielectrically positive media and comprising compounds having negative dielectric anisotropy in the case of dielectrically negative media.

The liquid-crystal media of the prior art generally have relatively low birefringence values, relatively high operating voltages (the threshold voltages ($V_0$) are often relatively high, in some cases greater than 2.3 V) and relatively long response times, which are inadequate, in particular, for video-capable displays. Furthermore, they are usually unsuitable for high operating temperatures and/or have inadequate low-temperature stabilities (LTSs). Thus, for example, the nematic phases often only extend down to −20° C. and in some cases even only down to −10° C.

For the most part, the liquid-crystal media of the prior art have relatively unfavourable values for $\Delta n$, which are often significantly smaller than 0.11 and in some cases smaller than 0.10. However, such small $\Delta n$ values are not particularly advantageous, for example, for VAN displays, since they require the use of cells having relatively large layer thicknesses, of 4 µm or more, and thus result in response times which are unacceptably long for many applications. Thus, a d·$\Delta n$ of approximately 0.30 µm is employed in the case of an untwisted director alignment.

However, the use of cells having very small layer thicknesses frequently results in low production yields in the displays. For fast-switching displays, $\Delta n$ values in the range from 0.075 to 0.15 are preferably desired. This applies both in the case of ECB displays and also in the case of IPS displays.

Since the response times of the prior art displays, as already mentioned above, are often too long, the viscosities of the liquid-crystal media must be improved and thus reduced. This applies, in particular, to the rotational viscosity $\gamma_1$ and very particularly to the value thereof at low temperatures. A reduction in the flow viscosity $\nu_{20}$ generally results, in particular in the case of displays having a homeotropic edge alignment of the liquid crystals (for example in the case of ECB and VAN displays), in a very desired shortening of the response times.

For industrial use of this effect in electro-optical display elements, there is a requirement for LC phases which have to satisfy a multiplicity of requirements. Particularly important here are the chemical resistance to moisture, air and physical influences, such as heat, radiation in the infrared, visible and ultraviolet regions, and direct and alternating electric fields.

Furthermore, LC phases which can be used industrially are required to have a liquid-crystalline mesophase in a suitable temperature range and low viscosities.

None of the series of compounds having a liquid-crystalline mesophase that are known to date includes a single compound which meets all these requirements. In general, therefore, mixtures of from two to 25, preferably from three to 18, compounds are prepared in order to obtain substances which can be used as LC phases. However, it has not been possible to prepare optimum phases easily in this way, since no liquid-crystal materials having significantly negative dielectric anisotropy and adequate long-term stability were hitherto available.

The displays based on the ECB effect and optionally on the IPS or PALCD effect have to date required specific, complex matching of the liquid-crystal mixtures to be employed to the particular mode or the particular configuration, in particular concerning $\Delta n$ and $\Delta \epsilon$ values and the rotational and flow viscosities.

Surprisingly, it has now been found that liquid-crystalline mixtures having negative anisotropy which have a certain ratio of $\gamma_1$ and $\Delta n$ or the square thereof do not have the disadvantages of the media from the prior art, or at least only do so to a significantly reduced extent. The present mixture concept according to the invention enables negative mixtures which can be employed universally for the ECB effect to be conceived easily for the various modes. The mixtures according to the invention are particularly suitable for VAN displays in the MVA and PVA configurations, furthermore for IPS, FFS and PA LCD.

The present invention thus relates to a liquid-crystalline medium based on a mixture of polar compounds having negative dielectric anisotropy ($\Delta \epsilon$), which is distinguished by the fact that it has a value for the ratio $\gamma_1/\Delta n^2$ in the range 6-45 Pa·s with a clearing point of >60° C. and a $\Delta \epsilon$ of $\leq -2.3$.

All values for the ratio of $\gamma_1/\Delta n^2$ indicated in this application have the unit [Pa·s], unless stated otherwise.

The mixtures according to the invention are distinguished by their short response times in ECB displays, a broad nematic phase and relatively high values for the voltage holding ratio (HR). The mixtures according to the invention having a $\gamma_1/\Delta n^2$ ratio of this type furthermore exhibit very favourable values for the capacitive threshold and at the same time very good low-temperature stability.

The invention therefore also relates to the use of the liquid-crystalline mixtures, in particular for displays based on the ECB, PALCD and IPS effect, and to the corresponding displays containing the mixtures according to the invention.

Preferred embodiments of the mixture concept according to the invention are indicated below.

The mixtures according to the invention preferably have a $\gamma_1/\Delta n^2$ of 6-30, preferably of 6-22.

The values for the optical anisotropy $\Delta n$ are preferably in the range 0.08-0.12. Particular preference is given to mixtures having a $\Delta n = 0.08 \pm 0.01$, furthermore having a $\Delta n = 0.10 \pm 0.005$ and $\Delta n = 0.12 \pm 0.01$.

The mixtures according to the invention preferably have clearing points of $\geq 65°$ C., in particular of $\geq 69°$ C.

The thresholds $V_0$ (capacitive) are preferably in the range 1.8-2.3 V.

The temperature stability (LTS) is preferably at least 1000 h at temperatures of $\leq -20°$ C., in particular $\leq -30°$ C. and very particularly preferably $\leq -40°$ C.

Mixtures which satisfy the required ratio of $\gamma_1/\Delta n^2$ preferably have, depending on $\Delta n$, $\Delta \epsilon$ and the clearing point, the following rotational viscosities, as tabulated below:

1. Clearing point 70° C.±5° C. and $\Delta \epsilon$ of $-3.0 \pm 0.6$

| $\Delta n$ | Rotational viscosities $\gamma_1$ |
|---|---|
| 0.08 ± 0.005 | ≤125 mPa·s, preferably ≤105 mPa·s |
| 0.09 ± 0.005 | ≤130 mPa·s, preferably ≤105 mPa·s |
| 0.10 ± 0.005 | ≤135 mPa·s, preferably ≤110 mPa·s |
| 0.11 ± 0.005 | ≤145 mPa·s, preferably ≤120 mPa·s |
| 0.12 ± 0.005 | ≤150 mPa·s, preferably ≤125 mPa·s |
| 0.13 ± 0.005 | ≤160 mPa·s, preferably ≤135 mPa·s |
| 0.15 ± 0.01 | ≤170 mPa·s, preferably ≤145 mPa·s |

The value for the ratio of $\gamma_1/\Delta n^2$ is preferably in the range 8.6-18.5. The thresholds are preferably <2.3 V, in particular in the range 2.0-2.3 V.

2. Clearing point 70° C.±5° C. and $\Delta \epsilon$ of $-4.0 \pm 0.4$

| $\Delta n$ | Rotational viscosities $\gamma_1$ |
|---|---|
| 0.08 ± 0.005 | ≤140 mPa·s, preferably ≤120 mPa·s |
| 0.09 ± 0.005 | ≤165 mPa·s, preferably ≤145 mPa·s |
| 0.10 ± 0.005 | ≤185 mPa·s, preferably ≤150 mPa·s |
| 0.11 ± 0.005 | ≤190 mPa·s, preferably ≤160 mPa·s |
| 0.12 ± 0.005 | ≤195 mPa·s, preferably ≤175 mPa·s |
| 0.13 ± 0.005 | ≤205 mPa·s, preferably ≤180 mPa·s |
| 0.15 ± 0.01 | ≤220 mPa·s, preferably ≤185 mPa·s |

The value for the ratio of $\gamma_1/\Delta n^2$ is preferably in the range 9.5-20.0. The thresholds are preferably <2.1 V, in particular in the range 1.8-2.1 V.

3. Clearing point 70° C.±5° C. and $\Delta \epsilon$ of $-5.0 \pm 0.6$

| $\Delta n$ | Rotational viscosities $\gamma_1$ |
|---|---|
| 0.08 ± 0.005 | ≤185 mPa·s, preferably ≤175 mPa·s |
| 0.09 ± 0.005 | ≤200 mPa·s, preferably ≤165 mPa·s |
| 0.10 ± 0.005 | ≤210 mPa·s, preferably ≤165 mPa·s |
| 0.11 ± 0.005 | ≤220 mPa·s, preferably ≤190 mPa·s |
| 0.12 ± 0.005 | ≤230 mPa·s, preferably ≤200 mPa·s |
| 0.13 ± 0.005 | ≤250 mPa·s, preferably ≤210 mPa·s |
| 0.15 ± 0.01 | ≤270 mPa·s, preferably ≤220 mPa·s |

The value for the ratio of $\gamma_1/\Delta n^2$ is preferably in the range 12.0-22.0. In the case of $\Delta n$ values of 0.08±0.005, the value may also be in the range 26-28. The thresholds are preferably <1.9 V, in particular in the range 1.7-1.8 V.

4. Clearing point 90° C.±5° C. and $\Delta \epsilon$ of $-3.0 \pm 0.6$

| $\Delta n$ | Rotational viscosities $\gamma_1$ |
|---|---|
| 0.08 ± 0.005 | ≤160 mPa·s, preferably ≤130 mPa·s |
| 0.09 ± 0.005 | ≤170 mPa·s, preferably ≤135 mPa·s |
| 0.10 ± 0.005 | ≤180 mPa·s, preferably ≤140 mPa·s |
| 0.11 ± 0.005 | ≤190 mPa·s, preferably ≤150 mPa·s |
| 0.12 ± 0.005 | ≤200 mPa·s, preferably ≤190 mPa·s |
| 0.13 ± 0.005 | ≤210 mPa·s, preferably ≤195 mPa·s |
| 0.15 ± 0.01 | ≤220 mPa·s, preferably ≤200 mPa·s |

The value for the ratio of $\gamma_1/\Delta n^2$ is preferably in the range 12.0-23.0. The thresholds are preferably <2.6 V, in particular in the range 2.30-2.55 V.

5. Clearing point 90° C.±5° C. and $\Delta \epsilon$ of $-4.0 \pm 0.4$

| $\Delta n$ | Rotational viscosities $\gamma_1$ |
|---|---|
| 0.08 ± 0.005 | ≤185 mPa·s, preferably ≤150 mPa·s |
| 0.09 ± 0.005 | ≤195 mPa·s, preferably ≤160 mPa·s |
| 0.10 ± 0.005 | ≤215 mPa·s, preferably ≤200 mPa·s |
| 0.11 ± 0.005 | ≤215 mPa·s, preferably ≤190 mPa·s |
| 0.12 ± 0.005 | ≤215 mPa·s, preferably ≤200 mPa·s |
| 0.13 ± 0.005 | ≤235 mPa·s, preferably ≤210 mPa·s |
| 0.15 ± 0.01 | ≤250 mPa·s, preferably ≤210 mPa·s |

The value for the ratio of $\gamma_1/\Delta n^2$ is preferably in the range 14.5-22.0. The thresholds are preferably <2.25 V, in particular in the range 2.00-2.25 V.

6. Clearing point 90° C.±5° C. and Δε of −5.0±0.6

| Δn | Rotational viscosities $\gamma_1$ |
|---|---|
| 0.08 ± 0.005 | ≦280 mPa·s, preferably ≦265 mPa·s |
| 0.09 ± 0.005 | ≦275 mPa·s, preferably ≦260 mPa·s |
| 0.10 ± 0.005 | ≦275 mPa·s, preferably ≦260 mPa·s |
| 0.11 ± 0.005 | ≦275 mPa·s, preferably ≦265 mPa·s |
| 0.12 ± 0.005 | ≦280 mPa·s, preferably ≦265 mPa·s |

The value for the ratio of $\gamma_1/\Delta n^2$ is preferably in the range 18.0-25.0. In the case of Δn values of 0.08±0.005, the value may also be in the range 40-45. The thresholds are preferably <2.0 V, in particular in the range 1.8-2.0 V.

Mixtures according to the invention having clearing points of 75-85° C. each have $\gamma_1/\Delta n^2$ values and $\gamma_1$ values between the above-mentioned limits for 70±5° C. and 90±5° C.

Preferred embodiments of the mixtures according to the invention with respect to their composition are mentioned below:

a) Liquid-crystalline medium which comprises at least two compounds of the formulae IA, IB and/or II

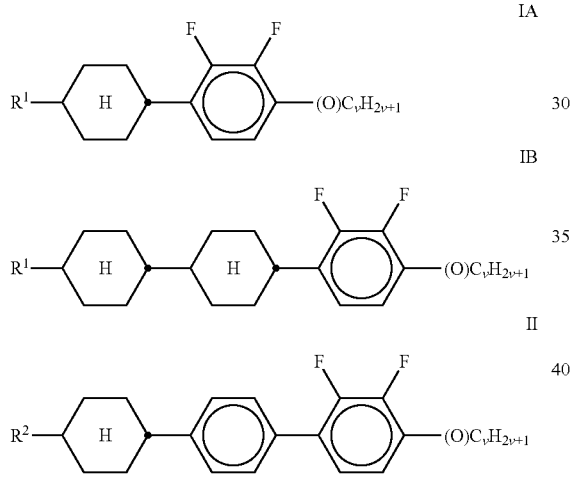

in which
R$^1$ and R$^2$ each, independently of one another, denote H, an alkyl or alkenyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

—C≡C—, —OCF$_2$—, —CF$_2$O—, —OC—O— or —O—CO— in such a way that O atoms are not linked directly to one another, and
v denotes 1 to 6.
R$^1$ and R$^2$ preferably denote straight-chain alkyl or straight-chain alkenyl.

Preferred mixtures, in particular having an n value of 0.08-0.09, comprise in total four compounds of the formulae

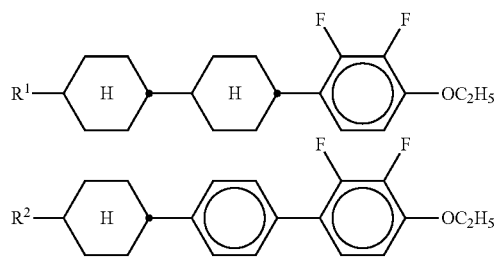

b) Liquid-crystalline medium which additionally comprises one or more compounds of the formula III

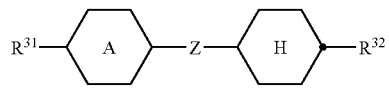

in which
R$^{31}$ and R$^{32}$ each, independently of one another, denote a straight-chain alkyl, alkylalkoxy or alkoxy radical having up to 12 C atoms, and

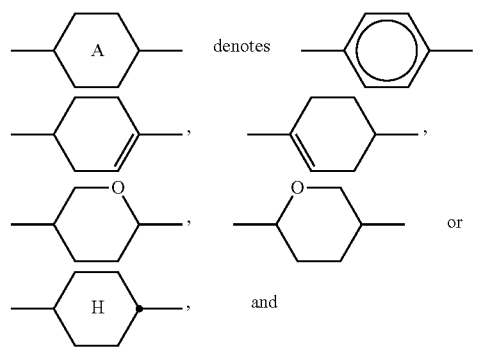

Z denotes a single bond, —C$_2$H$_4$—, —CH═CH—, —(CH$_2$)$_4$—, —(CH$_2$)$_3$O—, —O(CH$_2$)$_3$—, —CH═CHCH$_2$CH$_2$—, —CH$_2$CH$_2$CH═CH—, —CH$_2$O—, —OCH$_2$—, —CF$_2$O—, —OCF$_2$—, —COO—, —OCO—, —C$_2$F$_4$—, —CHFCF$_2$—, —CF═CF—, —CH═CF—, —CF═CH—, —CH$_2$—.

The mixtures according to the invention may comprise up to 50% by weight of neutral compounds, preferably selected from the compounds of the formula III.

c) Liquid-crystalline medium which comprises four, five, six or more, preferably two or three, compounds of the formulae IA and/or IB.

d) Liquid-crystalline medium in which R$^1$ and R$^2$ in the formulae IA and IB preferably have the following meanings: straight-chain alkyl, vinyl, 1E-alkenyl or 3-alkenyl.
If R$^1$ and/or R$^2$ denote alkenyl, it is preferably CH$_2$═CH, CH$_3$—CH═CH, C$_3$H$_7$—CH═CH, CH$_2$═CH—C$_2$H$_4$ or CH$_3$—CH═CH—C$_2$H$_4$.
In the compounds IA, IB and II, v preferably denotes 2, 3 or 4.

e) Liquid-crystalline medium in which the proportion of compounds of the formulae IA and/or IB in the mixture as a whole is at least 10% by weight, preferably at least 25% by weight and very particularly preferably ≧30% by weight.

f) Liquid-crystalline medium in which the proportion of compounds of the formula II in the mixture as a whole is at least 10% by weight.
g) Liquid-crystalline medium comprising at least two, preferably three, compounds of the formula II, in particular of the formula

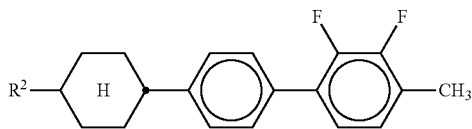

$R^2$ preferably denotes ethyl, propyl or pentyl.
h) Liquid-crystalline medium in which the proportion of compounds of the formula III in the mixture as a whole is at least 5% by weight.
i) Liquid-crystalline medium which additionally comprises a compound selected from the formulae IIIa to IIIj:

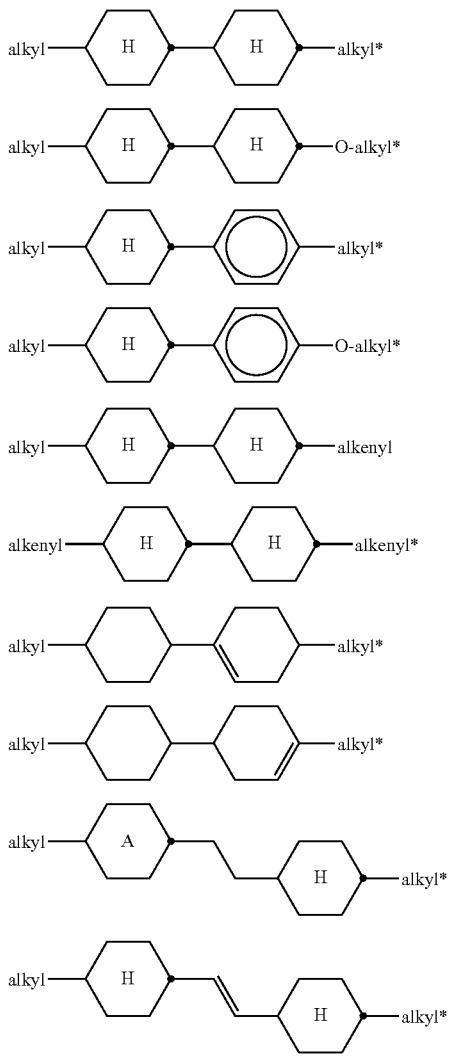

in which
alkyl and
alkyl* each, independently of one another, denote a straight-chain alkyl radical having 1-6 C atoms, and
alkenyl and
alkenyl* each, independently of one another, denote a straight-chain alkenyl radical having 2-6 C atoms, preferably vinyl, 1E-alkenyl or 3E-alkenyl.

The medium according to the invention preferably comprises at least one compound of the formula IIIa, formula IIIb and/or formula IIIe, preferably in amounts of >5% by weight, in particular >10% by weight, very particularly preferably >20% by weight.

Particularly preferred compounds of the formulae IIIe and IIIf are mentioned below:

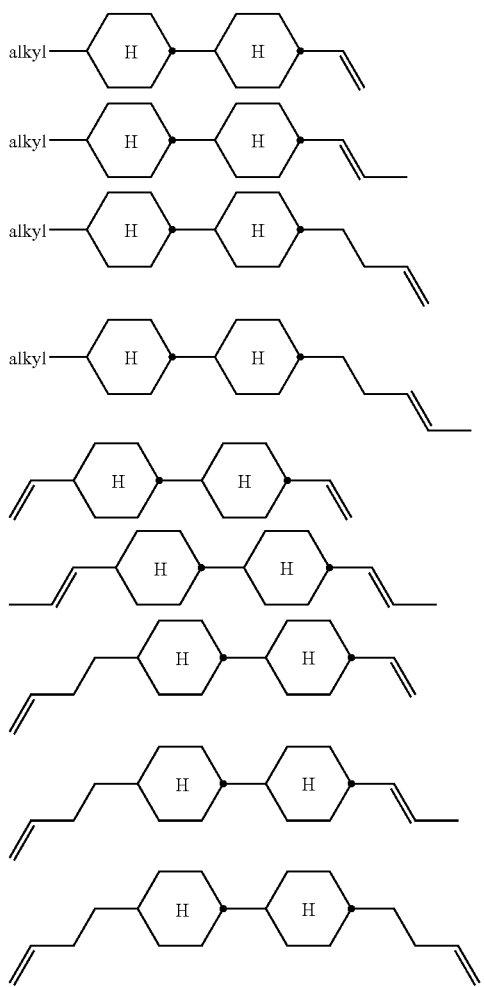

j) Liquid-crystalline medium which comprises at least three compounds of the formula IIIe, preferably selected from the group of the compounds

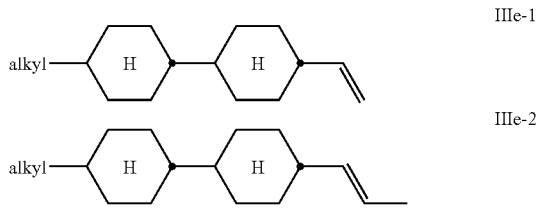

-continued

IIIe-3

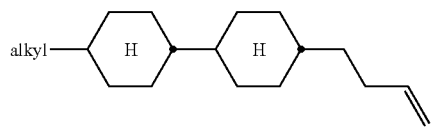

The proportion of the compounds IIIe-1, IIIe-2 and/or IIIe-3 in the mixture, preferably having a Δn=0.08 (±0.005), is preferably ≧20% by weight, in particular ≧30% by weight. alkyl preferably denotes $C_nH_{2n+1}$, where n=3, 4 or 5.

Preference is furthermore given to media which comprise the compound of the formula

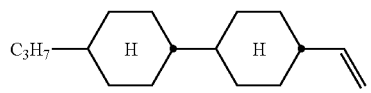

preferably in concentrations>20% by weight, in particular >30% by weight, preferably in combination with the compound of the formula

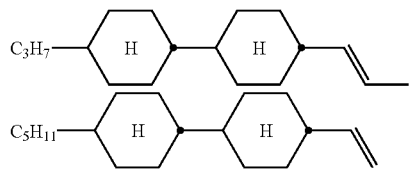

The latter compounds are preferably present in the mixture in amounts of 5-40% by weight.

k) Liquid-crystalline medium which essentially consists of:
   10-40% by weight of one or more compounds of the formulae IA and IB, and
   10-40% by weight of one or more compounds of the formula II.

l) Liquid-crystalline medium which additionally comprises one or more tetracyclic compounds of the formulae

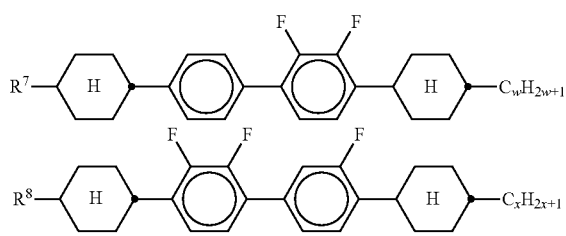

in which
R$^7$ and R$^8$ each, independently of one another, have one of the meanings indicated for R$^1$ in claim 1, and
w and x each, independently of one another, denote 1 to 6.

m) Particularly preferred media comprise one or more indane compounds selected from the group of the compounds of the formulae In-a to In-d:

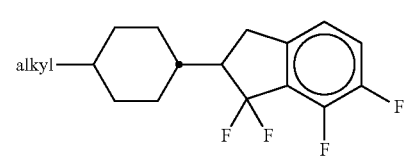
In-a

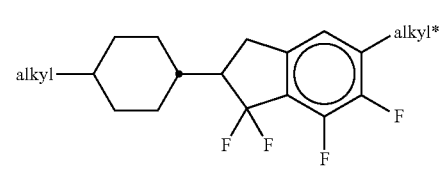
In-b

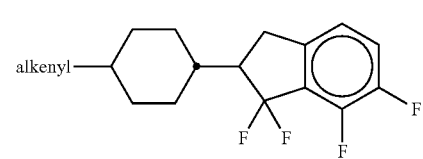
In-c

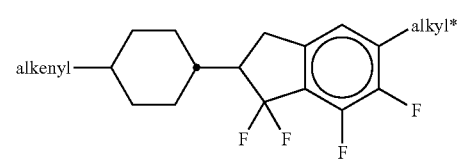
In-d in which
alkyl and
alkyl* each, independently of one another, denote a straight-chain alkyl radical having 1-6 C atoms, and
alkenyl denotes a straight-chain alkenyl radical having 2-6 C atoms.
alkyl preferably denotes $CH_3$, $C_2H_5$ or n-$C_3H_7$.

The mixtures according to the invention preferably comprise a compound of the formula In-a or In-b, in particular a compound of the formula In-a. The proportion of the indane compounds in the mixture as a whole is at least 5% by weight, preferably at least 10% by weight.

n) Liquid-crystalline medium which additionally comprises one or more compounds of the formulae

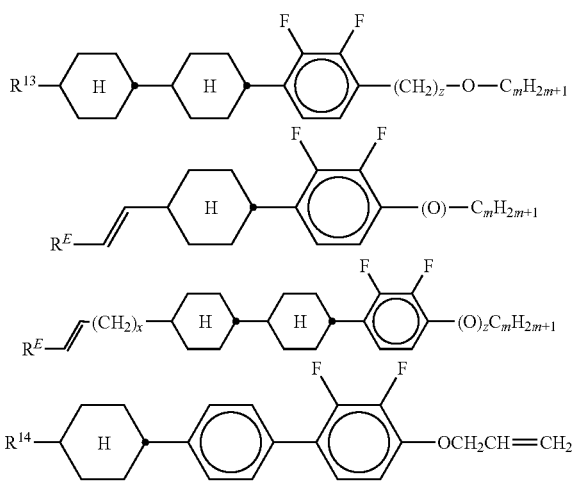

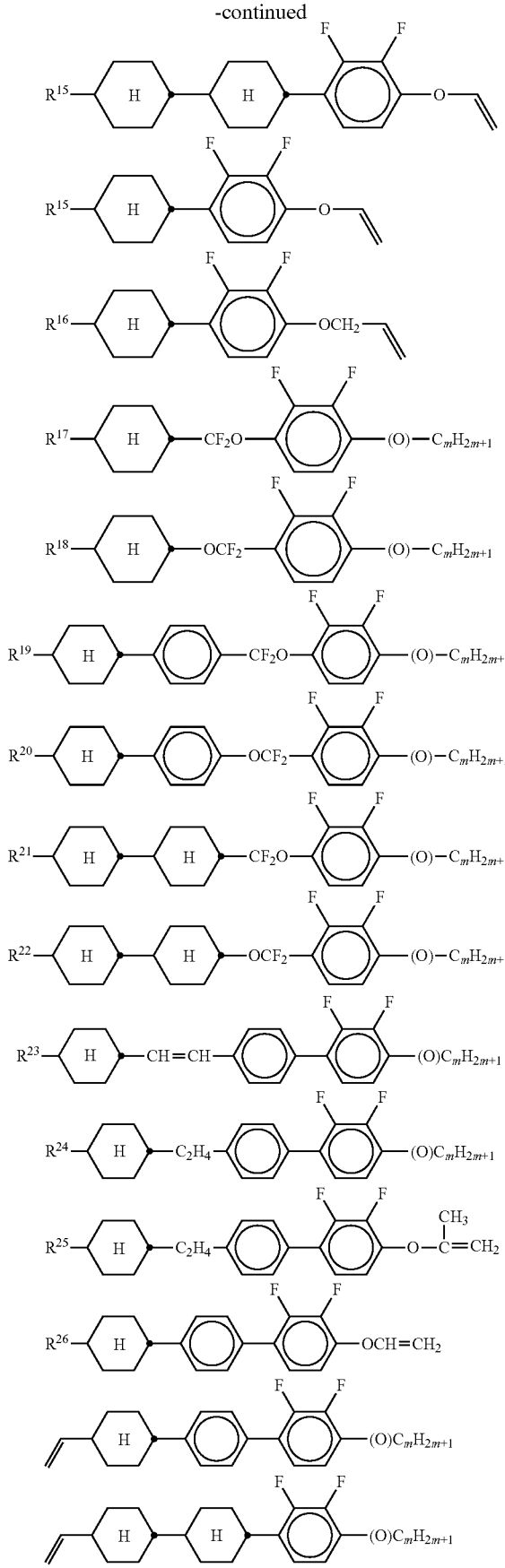

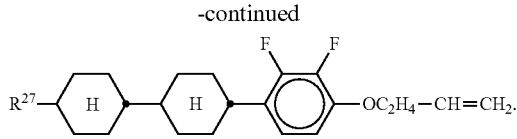

in which $R^{13}$-$R^{27}$ each, independently of one another, have the meanings indicated for $R^1$, and z and m each, independently of one another, denote 1-6. $R^E$ denotes H, $CH_3$, $C_2H_5$ or n-$C_3H_7$, and x denotes 0, 1, 2 or 3.

The said compounds are preferably each present in the mixture as a whole in amounts of at least 5% by weight.

Mixtures having a Δn in the range 0.08-0.12 preferably comprise compounds of the formula

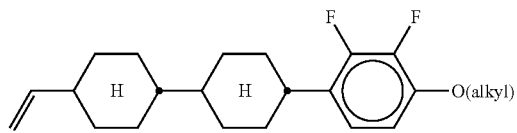

in concentrations of ≧5% by weight, preferably ≧10% by weight.

Mixtures of this type furthermore comprise compounds of the formula II in amounts of ≧2% by weight.

The compounds of the formula

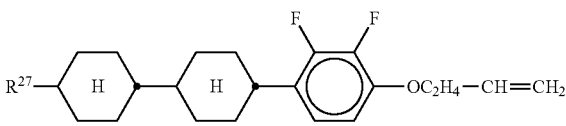

are particularly suitable for mixtures having a Δn value in the range 0.07-0.10, in particular 0.07-0.09. These compounds, in which $R^{27}$ preferably denotes alkyl, are preferably employed in concentrations of 5-20% by weight.

o) Liquid-crystalline medium additionally comprising one or more fluorinated terphenyls of the formulae T-1 to T-22

T-1

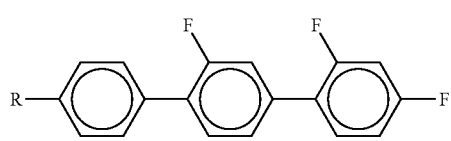

T-2

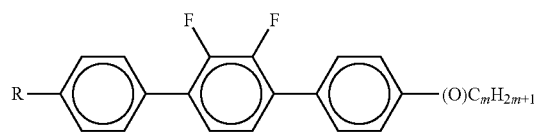

T-3

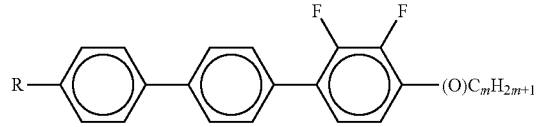

T-4
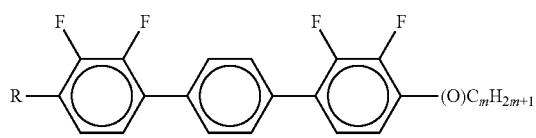

T-5
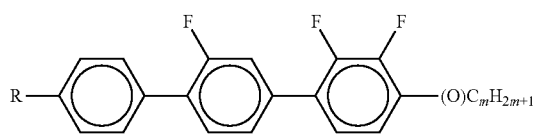

T-6
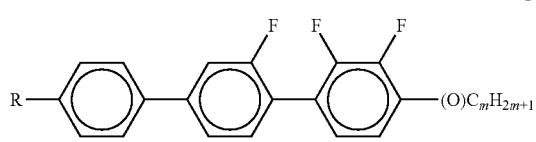

T-7
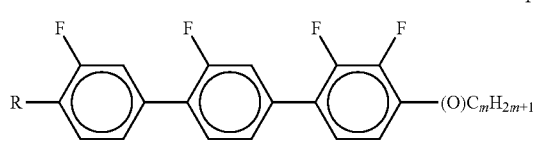

T-9
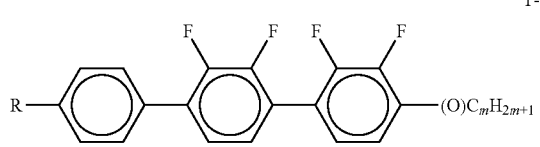

T-10
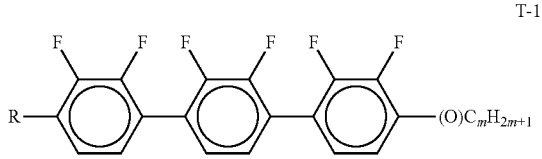

T-11
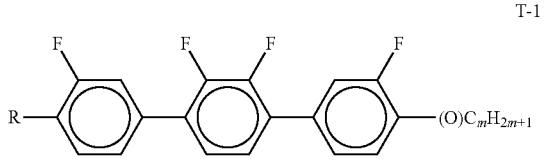

T-12
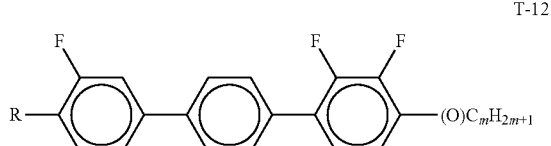

T-13
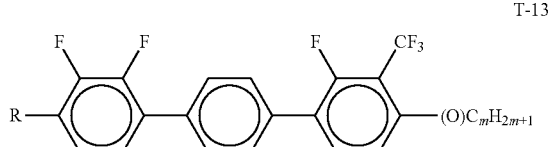

T-14
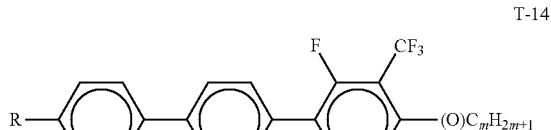

T-15
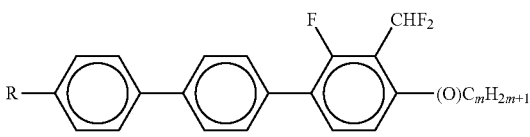

T-16
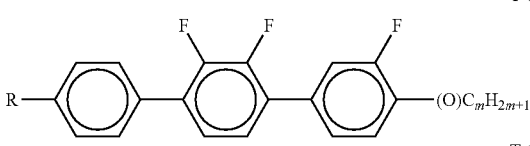

T-17
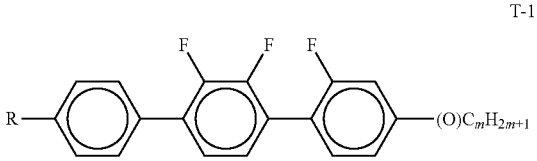

T-18
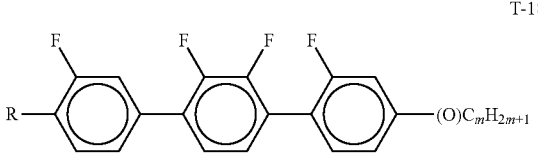

T-19
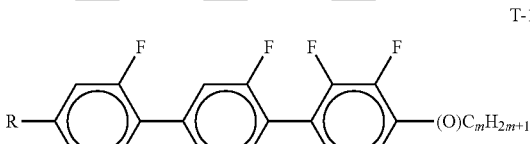

T-20
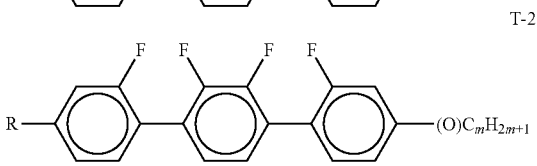

T-21

T-22
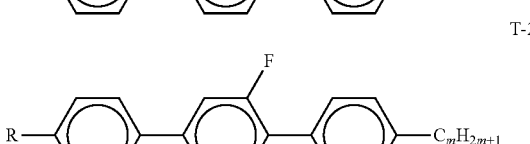

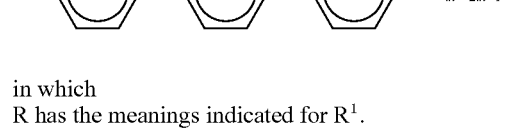

in which

R has the meanings indicated for $R^1$.

R is preferably straight-chain alkyl, alkoxy or alkylalkoxy, each having 1-6 C atoms, alkenyl or alkenyloxy having 2-6 C atoms. R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-22 in amounts of 2-30% by weight, in particular of 5-20% by weight.

Particular preference is given to compounds of the formulae T-1, T-2, T-3 and T-22. In these compounds, R preferably denotes alkyl, furthermore alkoxy, each having 1-5 C atoms.

The terphenyls are preferably employed in mixtures having a $\Delta n \geqq 0.10$ in combination with the compounds of the formulae IA, IB and II. Preferred mixtures comprise 2-20% by weight of terphenyls and 5-30% by weight of the compounds of the formula II.

p) Liquid-crystalline medium additionally comprising one or more biphenyls of the formulae B-1 to B-4

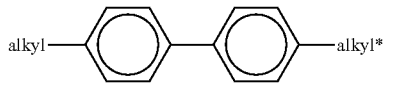

B-1

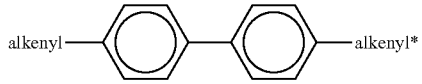

B-2

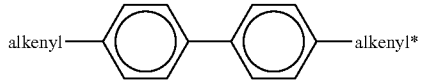

B-3

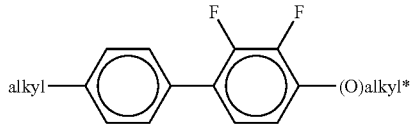

B-4 in which alkyl, alkyl*, alkenyl and alkenyl* have the above-mentioned meanings.

The proportion of the biphenyls of the formulae B-1 to B-4 in the mixture as a whole is preferably at least 3% by weight, in particular ≧5% by weight.

Of the compounds of the formulae B-1 to B-4, the compounds of the formulae B-1 and B-4 are particularly preferred.

Preferred biphenyls are likewise

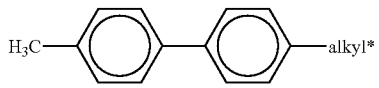

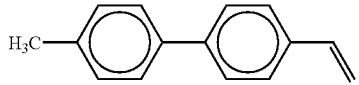

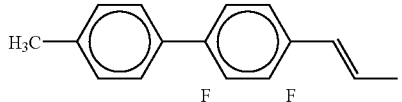

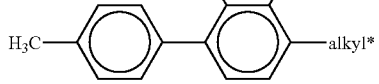

q) Liquid-crystalline medium additionally comprising one or more esters of the formulae E-1 to E-3

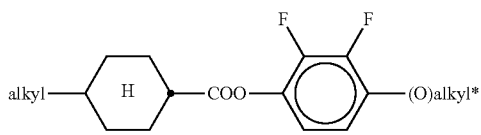

E-1

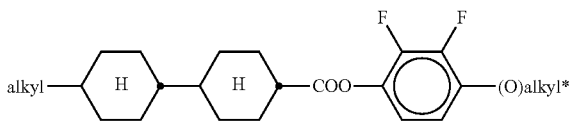

E-2

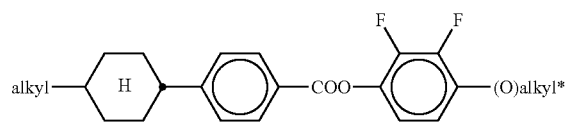

E-3 in which alkyl and alkyl* have the above-mentioned meanings.

The proportion of the esters in the mixture as a whole is preferably at least 10% by weight, in particular ≧30% by weight.

Of the compounds E-1 to E-3, the compound E-1 is particularly preferred.

r) Liquid-crystalline medium additionally comprising one or more tolans of the formulae To-1 and To-2

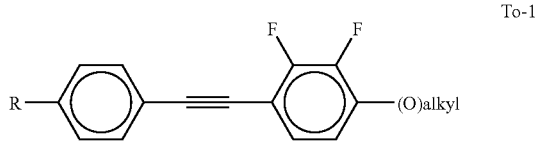

To-1

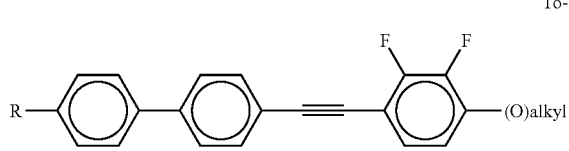

To-2 in which R and alkyl have the above-mentioned meanings.

The proportion of the tolans To-1 and/or To-2 in the mixture as a whole is preferably at least 5% by weight, in particular ≧20% by weight.

In the compounds To-1 and To-2, R preferably denotes straight-chain alkyl or alkoxy.

s) Liquid-crystalline medium additionally comprising one or more nitrites of the formulae N-1 and N-2

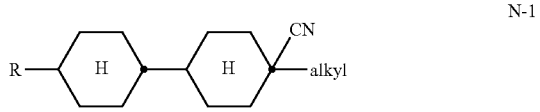

N-1

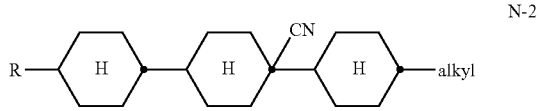

N-2 in which R and alkyl have the above-mentioned meanings.

The proportion of the nitriles in the mixture as a whole is preferably at least 5% by weight, in particular ≧25% by weight.

t) Liquid-crystalline medium comprising at least 10% by weight, preferably ≧15% by weight, in particular ≧20% by weight, of compounds of the formula B-4. Compounds of this type are preferably used in mixtures having a Δn≧0.12. The biphenyls of the formula B-4 are preferably employed in combination with compounds of the formulae II and/or B-1.

Preferred mixtures having a Δn≧0.12 comprise at least 15% by weight of compounds of the formula II and/or ≧5% by weight of compounds of the formula B-1 besides the compounds of the formula B-4.

Compounds of the formula B-4 are furthermore preferably employed in combination with terphenyls, preferably with T-1, T-2 and/or T-3.

u) Liquid-crystalline medium comprising at least one compound of the formulae Z-1 to Z-10

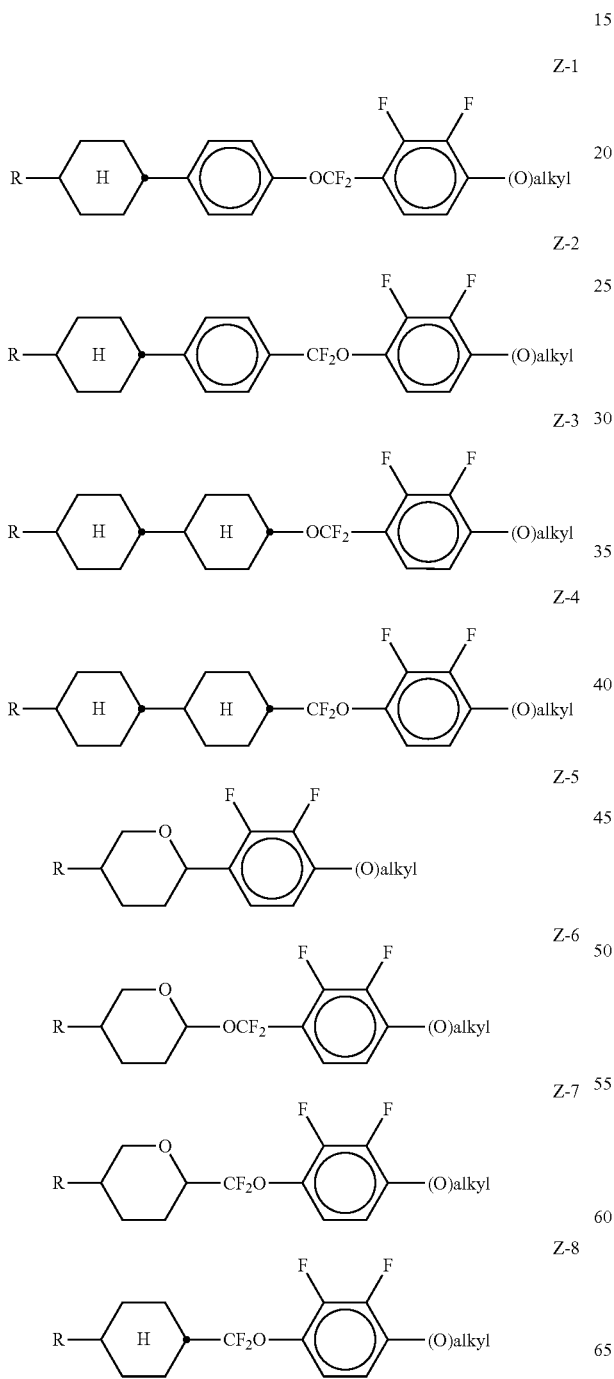

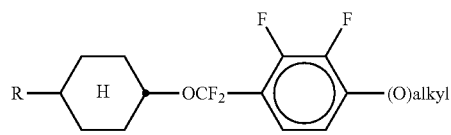

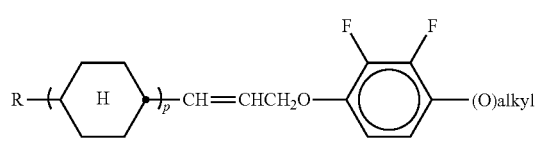

in which R and alkyl have the above-mentioned meanings, and p is 1 or 2, preferably in amounts of ≧5% by weight, in particular ≧10% by weight.

Particular preference is given to media which comprise one, two or more compounds of the formulae Z-1 to Z-7 and additionally one, two or more compounds of the formula II. Mixtures of this type preferably comprise ≧10% by weight of compounds of the formula II and optionally also compounds of the formula IA.

v) Liquid-crystalline medium comprising at least one compound of the formula

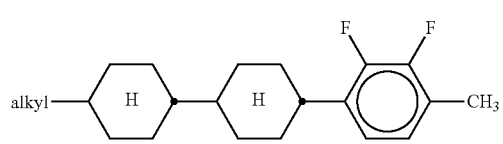

Preferred compounds of the formula IB-M are the compounds IB-M1 to IB-M3:

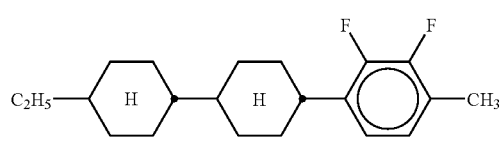

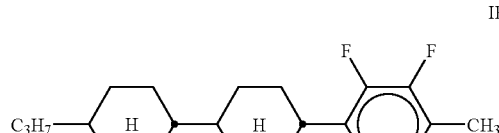

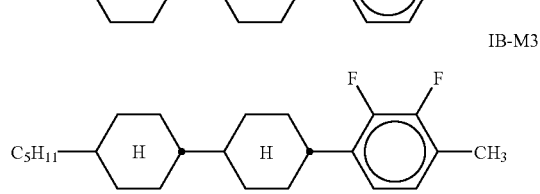

The mixtures according to the invention preferably comprise at least one compound of the formula IB-M, in particular the compound IB-M1, IB-M2 and/or IB-M3, and at least one compound

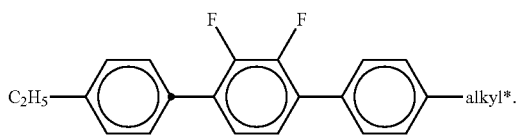

w) Liquid-crystalline medium comprising at least one compound of the formulae

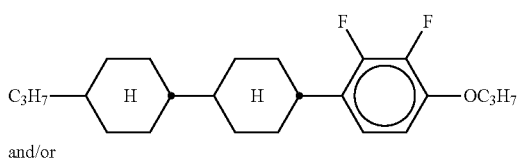

and/or

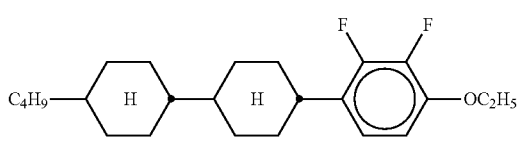

preferably in amounts of 5-20% by weight, in particular in combination with one or more compounds of the formulae T-1 to T-21.

x) Liquid-crystalline medium comprising at least one compound of the formula T-1 and at least one compound of the formula T-4.

y) Liquid-crystalline medium comprising at least one compound of the formula

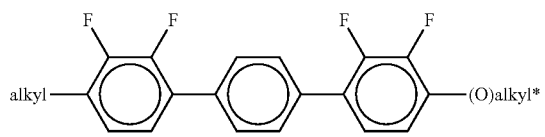

and at least one compound of the formula

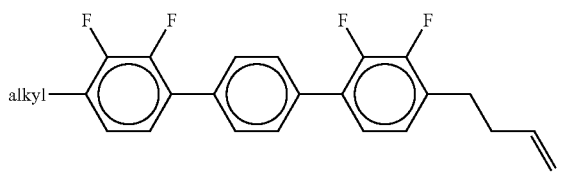

The invention furthermore relates to an electro-optical display having active-matrix addressing based on the ECB effect, characterised in that it contains, as dielectric, a liquid-crystalline medium according to one of claims 1 to 17.

The liquid-crystal mixture preferably has a nematic phase range of at least 60 K and a flow viscosity $v_{20}$ of at most 30 mm$^2$·s$^{-1}$, preferably <25 mm$^2$·s$^{-1}$, at 20° C.

The liquid-crystal mixture according to the invention has a $\Delta\epsilon$ of about −2.3 to −8.0, in particular about −3.0 to −6.0, very particularly preferably ≦−3.0 to −5.0.

The rotational viscosity $\gamma_1$ is preferably <200 mPa·s, in particular <190 mPa·s.

z) Liquid-crystalline medium comprising at least one compound of the formulae O-1 to O-11

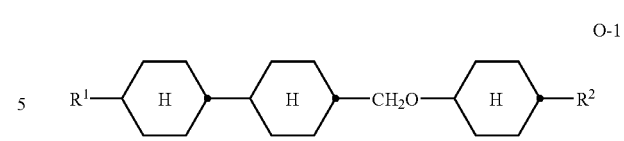

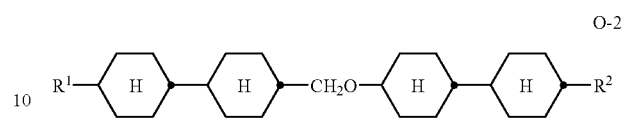

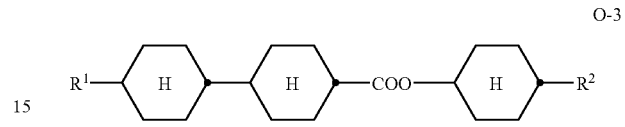

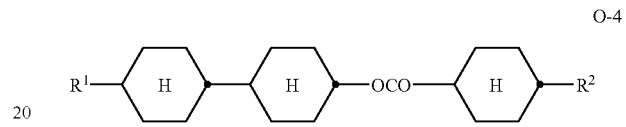

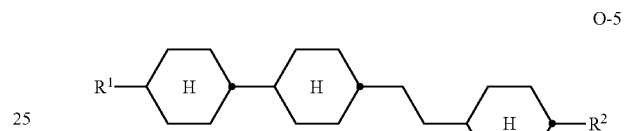

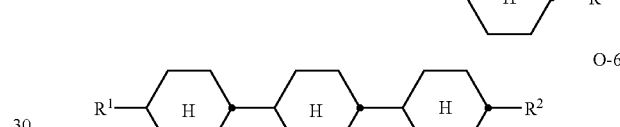

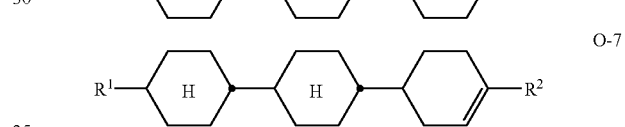

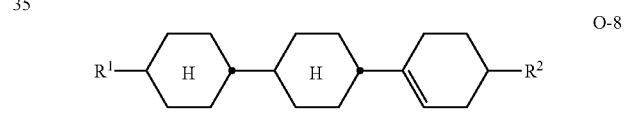

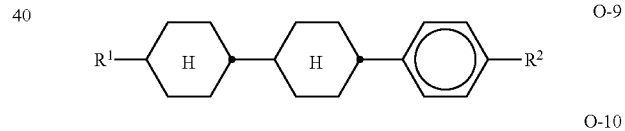

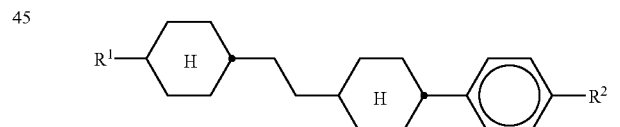

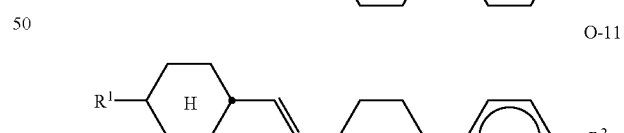

in which $R^1$ and $R^2$ have the above-mentioned meanings, $R^1$ and $R^2$ preferably each, independently of one another, denote straight-chain alkyl, furthermore alkenyl.

Preferred liquid-crystalline media according to the invention comprise one or more substances having a $\Delta\epsilon$<2.3 which contain a tetrahydronaphthyl or naphthyl unit, such as, for example, the compounds of the formulae N-1 to N-5

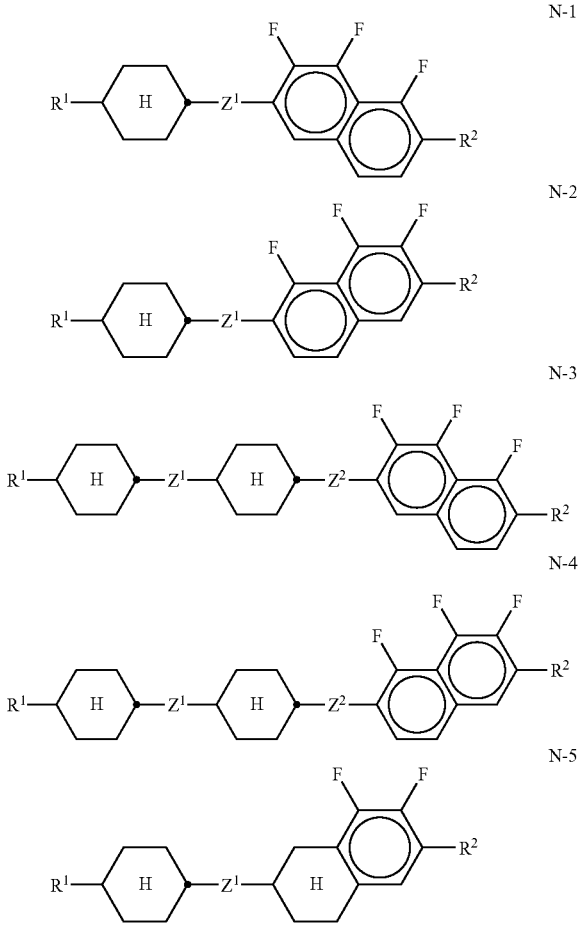

in which $R^1$ and $R^2$ each, independently of one another, have the above-mentioned meanings, preferably denote straight-chain alkyl, straight-chain alkoxy or straight-chain alkenyl, and Z, $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CH$_2$— or a single bond.

The birefringence Δn in the liquid-crystal mixture is, generally, between 0.07 and 0.16, preferably between 0.08 and 0.12.

The mixtures according to the invention are suitable for all VA-TFT applications, such as, for example, VAN, MVA, (S)-PVA, ASV. They are furthermore suitable for IPS (in plane switching) and FFS (fringe field switching) LCD applications having negative Δε.

The individual components of the formulae IA, IB, II and III of the liquid-crystal phases according to the invention are either known or their preparation methods can readily be derived from the prior art by the relevant person skilled in the art since they are based on standard methods described in the literature.

The nematic liquid-crystal mixtures in the displays according to the invention generally comprise two components A and B, which themselves consist of one or more individual compounds.

Component A has clearly negative dielectric anisotropy and provides the nematic phase with a dielectric anisotropy of ≦−2.3. It preferably comprises compounds of the formulae IA and/or IB and II.

The proportion of component A is preferably between 45 and 100%, in particular between 60 and 100%.

For component A, one (or more) individual compound(s) having a value of Δε≦−0.8 is (are) preferably selected. This value must be more negative the smaller the proportion of A in the mixture as a whole.

Component B has pronounced nematogeneity and a flow viscosity of not greater than 30 mm$^2$·s$^{-1}$, preferably not greater than 25 mm$^2$·s$^{-1}$, at 20° C.

Particularly preferred individual compounds of component B are extremely low-viscosity nematic liquid crystals having a flow viscosity of not greater than 18, preferably not greater than 12 mm$^2$·s$^{-1}$, at 20° C. Component B is monotropically or enantiotropically nematic, has no smectic phases and can prevent the occurrence of smectic phases in liquid-crystal mixtures down to very low temperatures. If, for example, various materials having high nematogeneity are each added to a smectic liquid-crystal mixture, the nematogeneity of these materials can be compared through the degree of suppression of smectic phases that is achieved. A multiplicity of suitable materials is known to the person skilled in the art from the literature. Particular preference is given to compounds of the formula III, furthermore compounds of the formulae B-1 to B-4, O-1 and O-2.

In addition, these liquid-crystal phases may also comprise more than 18 components, preferably 18 to 25 components.

The phases preferably comprise 4 to 15, in particular 5 to 12, compounds of the formulae IA and/or IB, II and optionally III.

Besides compounds of the formulae IA and/or IB, II and III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acids.

The most important compounds which are suitable as constituents of liquid-crystal phases of this type can be characterised by the formula IV

—$R^9$-L-G-E-$R^{10}$                    IV in which L and E each denote a carbocyclic or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G denotes | —CH=CH— | —N(O)=N— |
|---|---|---|
| | —CH—CQ— | —CH=N(O)— |
| | —C≡C— | —CH$_2$—CH$_2$— |
| | —CO—O— | —CH$_2$—O— |
| | —CO—S— | —CH$_2$—S— |

-continued

—CH=N— —COO—Phe—COO—
—CF₂O— —CF=CF—
—OCF₂ —OCH₂—
—(CH₂)₄— —(CH₂)₃O— or a C—C single bond, Q denotes halogen, preferably chlorine, or —CN, and $R^9$ and $R^{10}$ each denote alkyl, alkenyl, alkoxy, alkanoyloxy or alkoxycarbonyloxy having up to 18, preferably up to 8, carbon atoms, or one of these radicals alternatively denotes CN, NC, $NO_2$, NCS, SCN, $CF_3$, $OCF_3$, F, Cl or Br.

In most of these compounds, $R^9$ and $R^{10}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS, FFS or PA LCD mixture according to the invention may also comprise compounds in which, for example, H, N, O, Cl and F have been replaced by the corresponding isotopes.

The construction of the liquid-crystal displays according to the invention corresponds to the usual geometry, as described, for example, in EP-A 0 240 379.

Besides the compounds of the formulae IA, IB, II and III, the mixtures according to the invention preferably comprise one or more of the compounds mentioned above.

The following abbreviations are used:
(m, m=1-6; z=1-6)

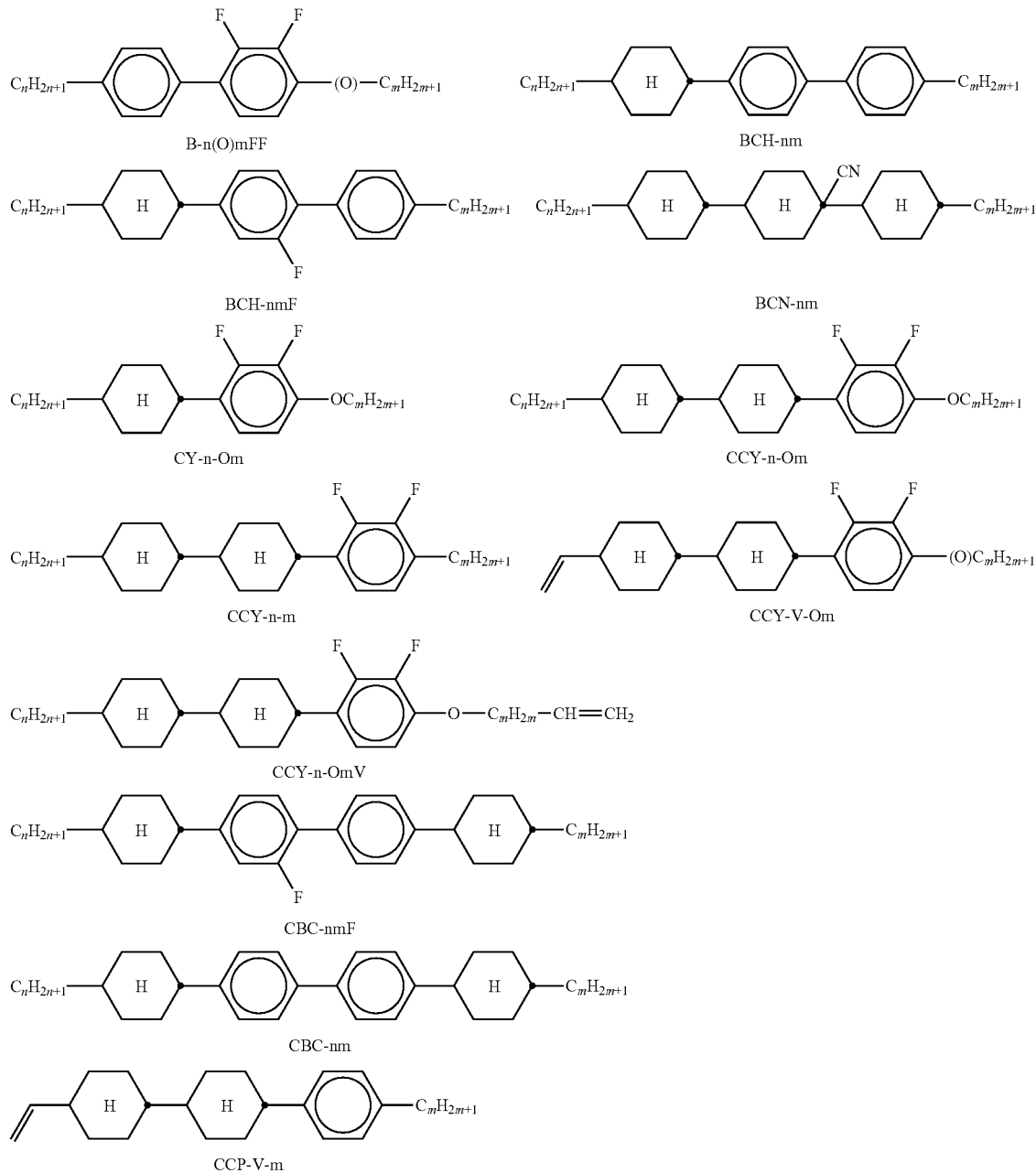

-continued
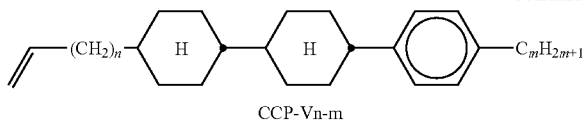
CCP-Vn-m
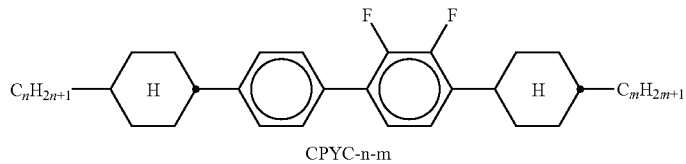
CPYC-n-m
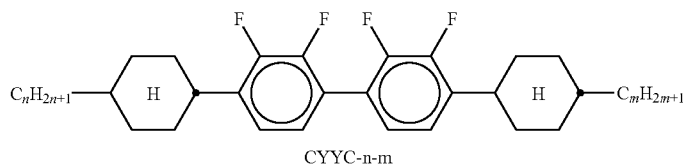
CYYC-n-m
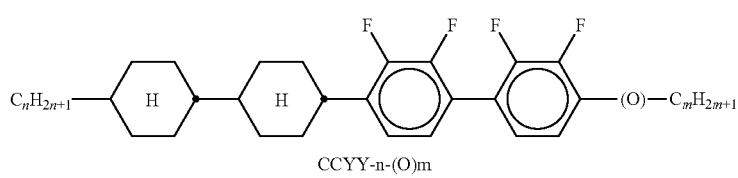
CCYY-n-(O)m
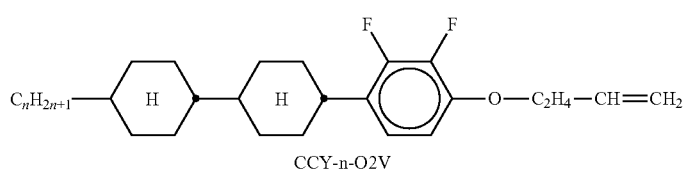
CCY-n-O2V
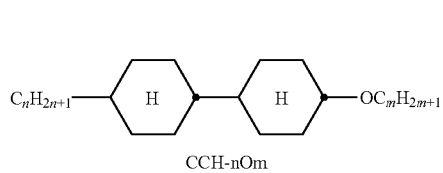
CCH-nOm
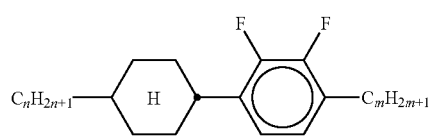
CY-n-m
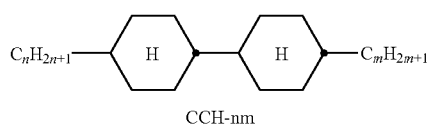
CCH-nm
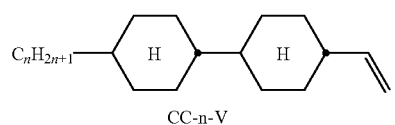
CC-n-V
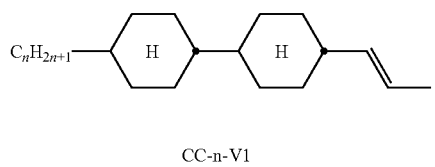
CC-n-V1
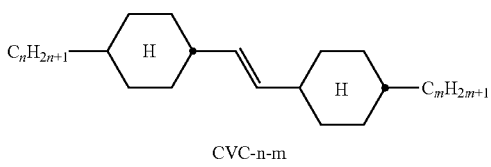
CVC-n-m
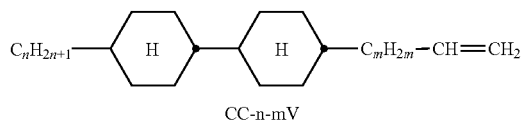
CC-n-mV
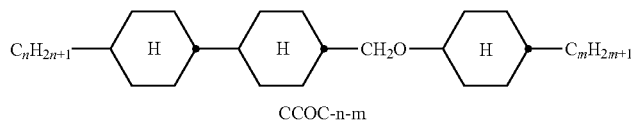
CCOC-n-m
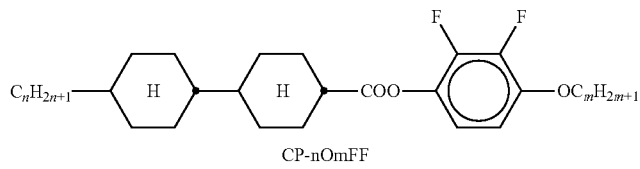
CP-nOmFF

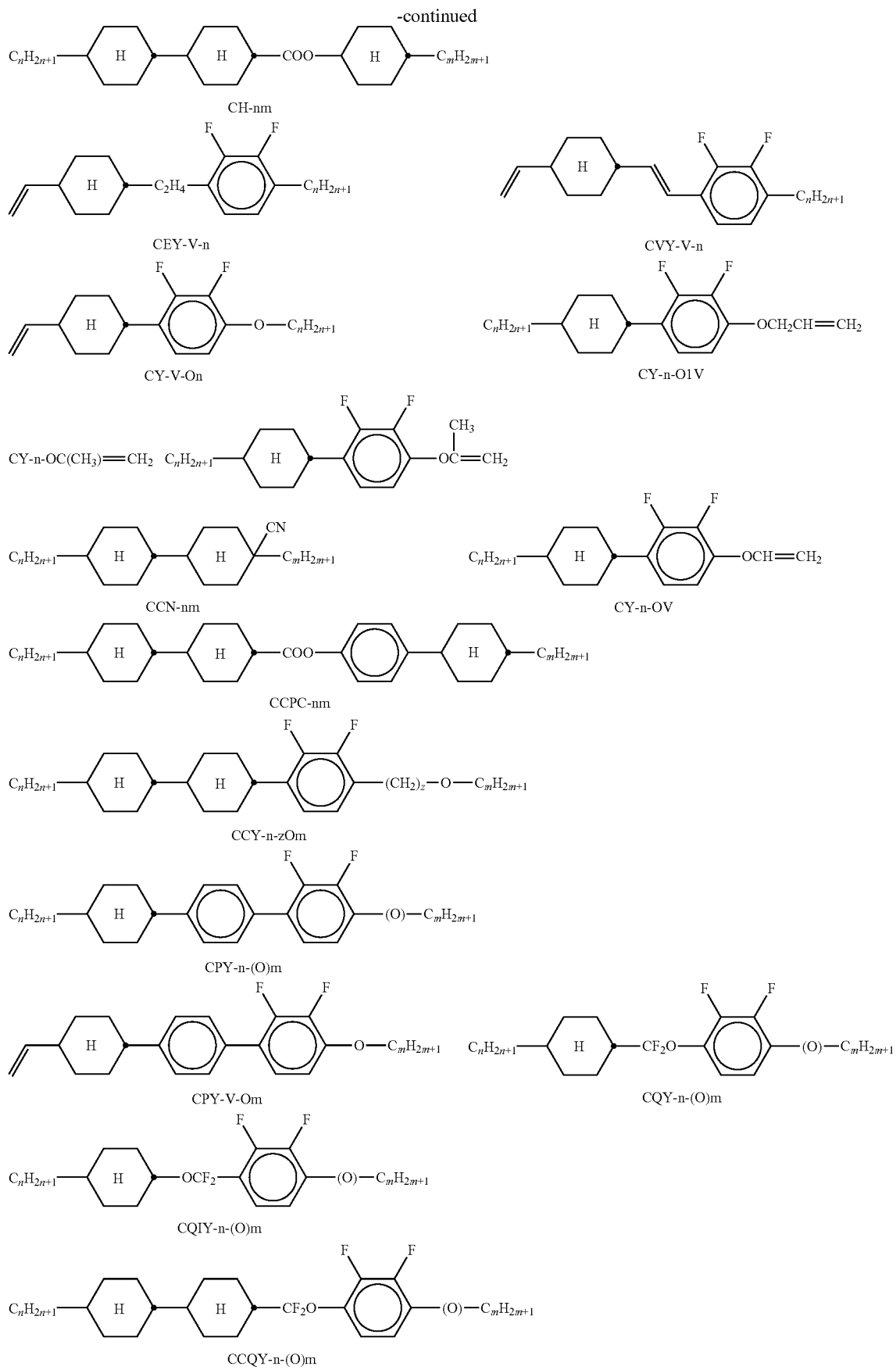

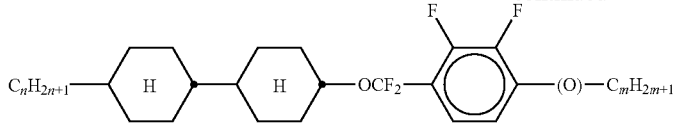
CCQIY-n-(O)m
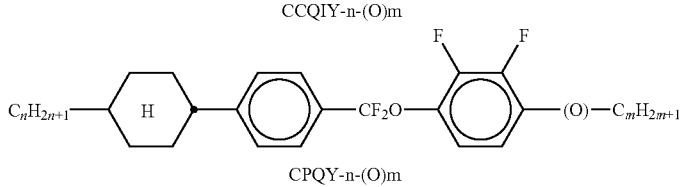
CPQY-n-(O)m
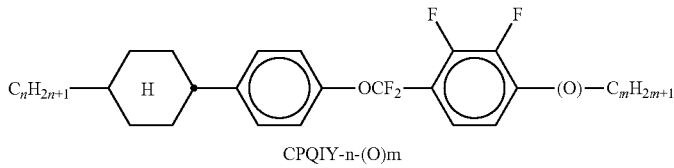
CPQIY-n-(O)m
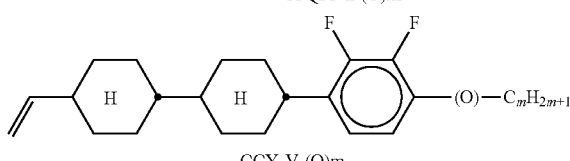
CCY-V-(O)m
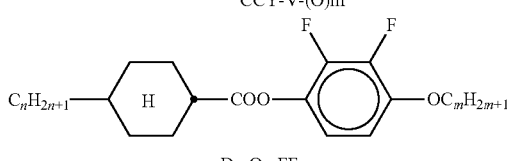
D-nOmFF
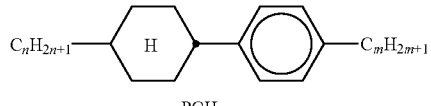
PCH-nm
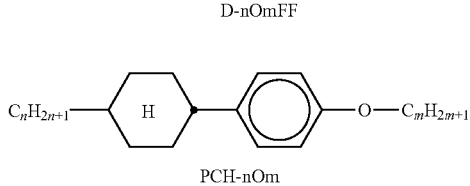
PCH-nOm
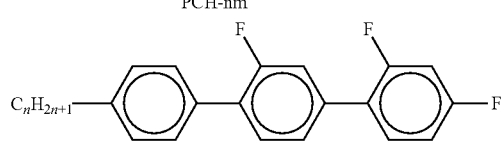
PGIGI-n-F
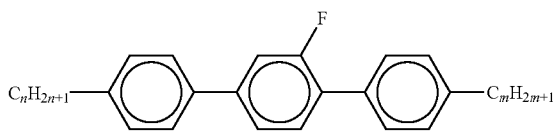
PGP-n-m
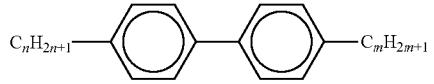
PP-n-m
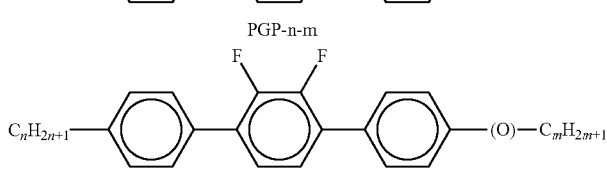
PYP-n-(O)m
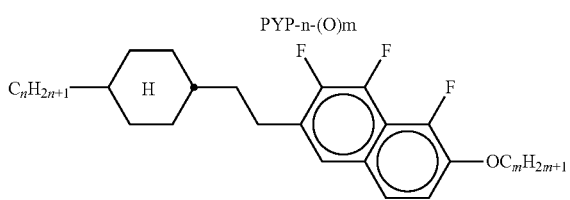
CENap-n-Om
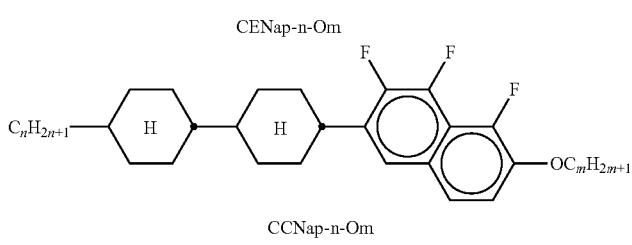
CCNap-n-Om

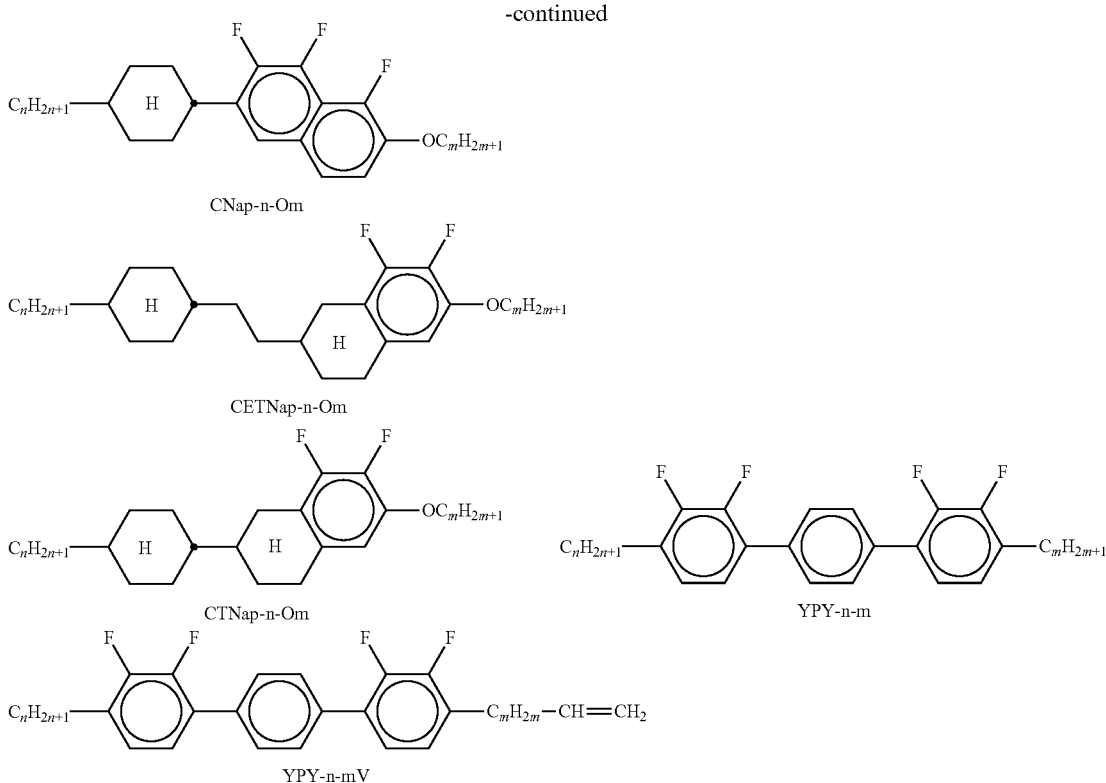

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

In the present application, the term dielectrically positive compounds denotes compounds having a $\Delta\epsilon > 1.5$, the term dielectrically neutral compounds denotes those having $-1.5 \leq \Delta\epsilon \leq 1.5$ and the term dielectrically negative compounds denotes those having $\Delta\epsilon < -1.5$. The dielectric anisotropy of the compounds is determined here by dissolving 10% of the compounds in a liquid-crystalline host and determining the capacitance of this mixture in at least one test cell in each case having a layer thickness of 20 µm with a homeotropic and with a homogeneous surface alignment at 1 kHz. The measurement voltage is typically 0.5 V to 1.0 V, but is always lower than the capacitive threshold of the respective liquid-crystal mixture.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constants of the host mixture after addition of the compound to be investigated and extrapolation to 100% of the compound employed.

The term threshold voltage relates in a conventional manner to the optical threshold for 10% relative contrast ($V_{10}$), unless explicitly stated otherwise.

In the present application, however, the term threshold voltage is used for the capacitive threshold voltage ($V_0$), also known as the Freedericks threshold, in relation to the liquid-crystal mixtures having negative dielectric anisotropy, unless explicitly stated otherwise.

All concentrations in this application, unless explicitly noted otherwise, are indicated in percent by weight and relate to the corresponding mixture or mixture component. All physical properties are determined in accordance with "Merck Liquid Crystals, Physical Properties of Liquid Crystals", Status Nov. 1997, Merck KGaA, Germany, and apply for a temperature of 20° C., unless explicitly stated otherwise. An is determined at 589 nm and $\Delta\epsilon$ at 1 kHz.

For the liquid-crystal media having negative dielectric anisotropy, the threshold voltage is determined as the capacitive threshold $V_0$ (also known as the Freedericks threshold) in test cells produced at Merck KGaA, Germany, with liquid crystal homeotropically aligned by alignment layer SE 1211 from Nissan Chemicals.

The dielectrics may also comprise further additives known to the person skilled in the art and described in the literature, such as, for example, UV absorbers, antioxidants, free-radical scavengers. For example, 0-15% of pleochroic dyes may be added, furthermore conductive salts, preferably ethyldimethyldodecylammonium 4-hexyloxybenzoate, tetrabutylammonium tetraphenylborate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The liquid-crystal media according to the invention may, if necessary, also comprise chiral dopants in the conventional amounts. The amount of these dopants employed is in total 0 to 10%, based on the amount of the mixture as a whole, preferably 0.1 to 6%. The concentration of the individual compounds employed is preferably 0.1 to 3%. The concentration of these and similar additives is not taken into account when indicating the concentrations and the concentration ranges of the liquid-crystal compounds in the liquid-crystal media.

Table A indicates possible dopants which can be added to the mixtures according to the invention.

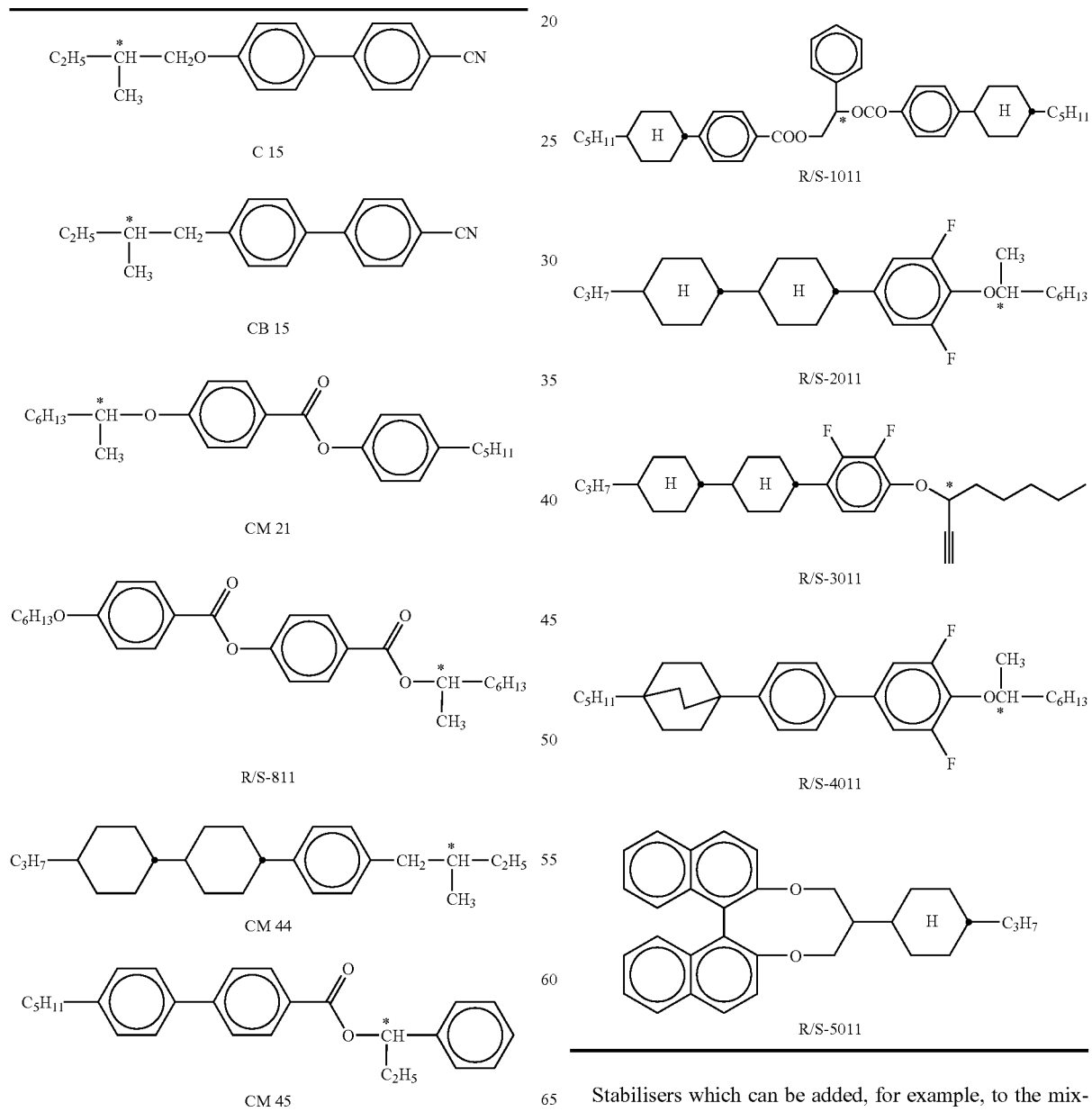

TABLE A

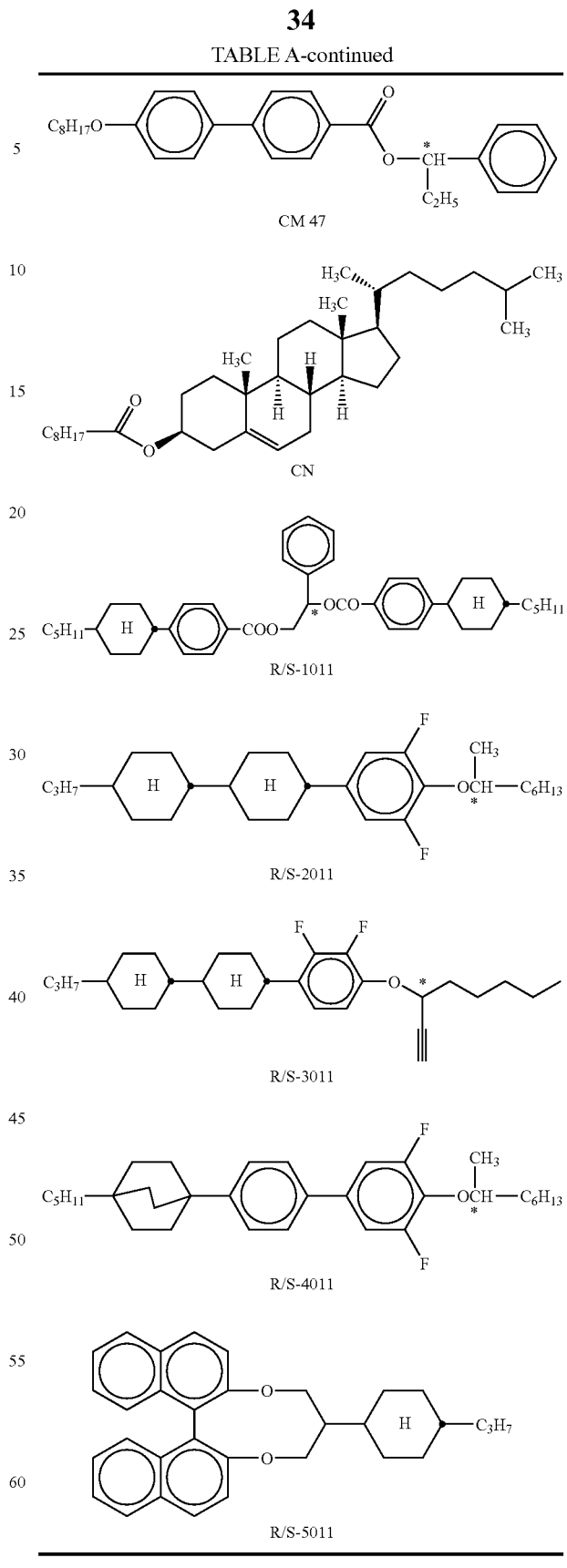

TABLE A-continued

Stabilisers which can be added, for example, to the mixtures according to the invention in amounts of 0-10% are mentioned below in Table B.

TABLE B
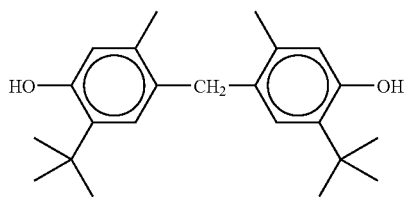 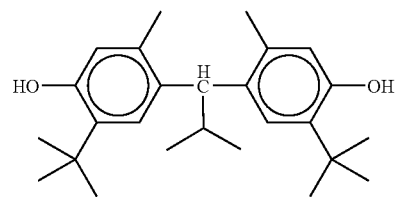
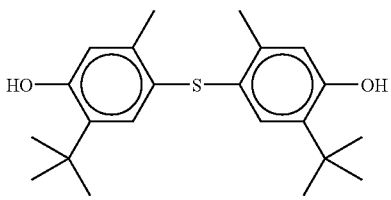 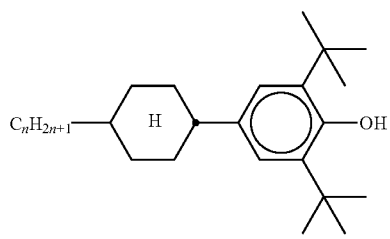 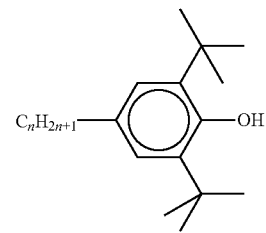
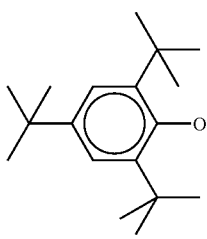 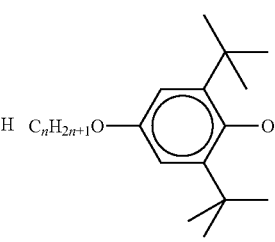 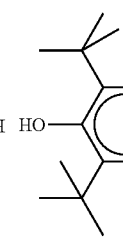 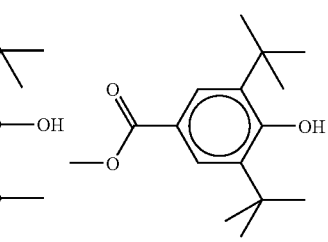
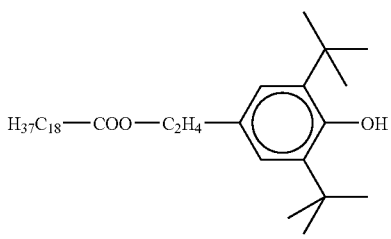 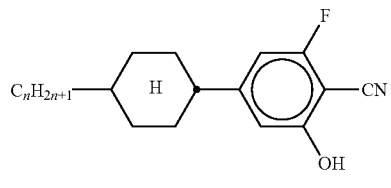 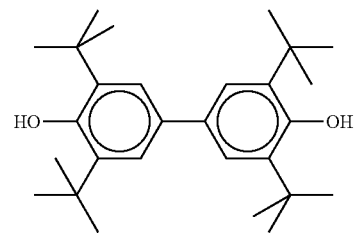
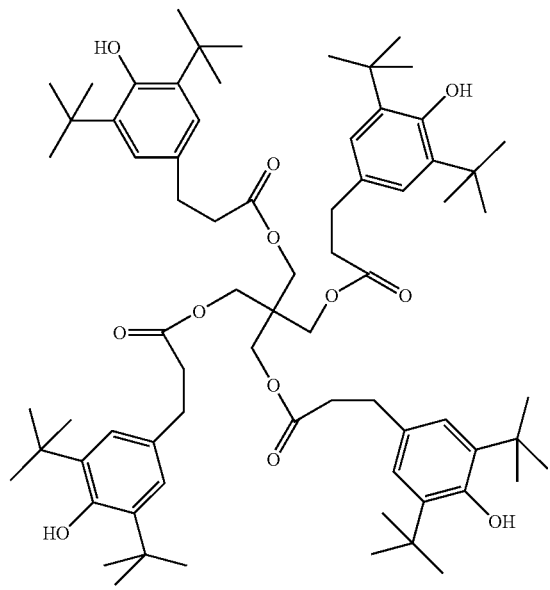

TABLE B-continued
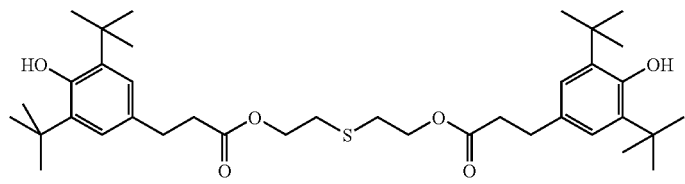
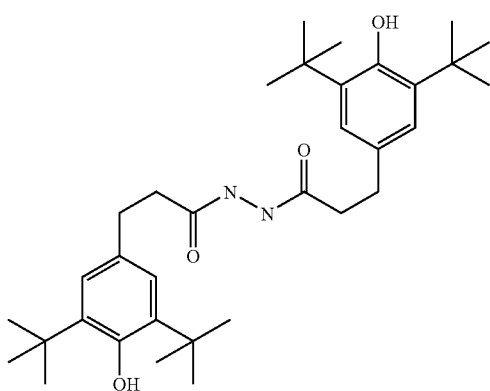
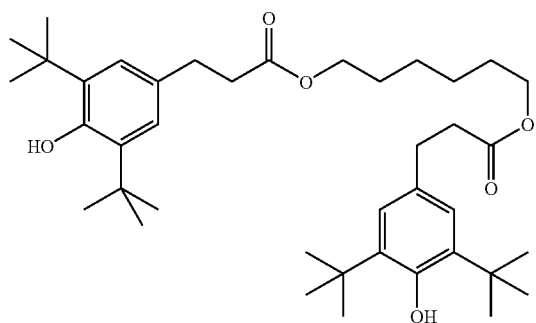
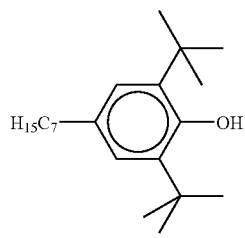
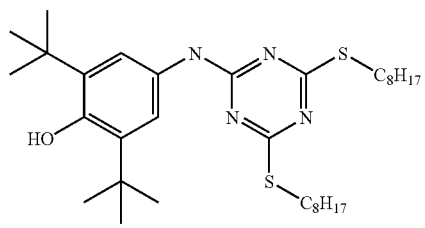
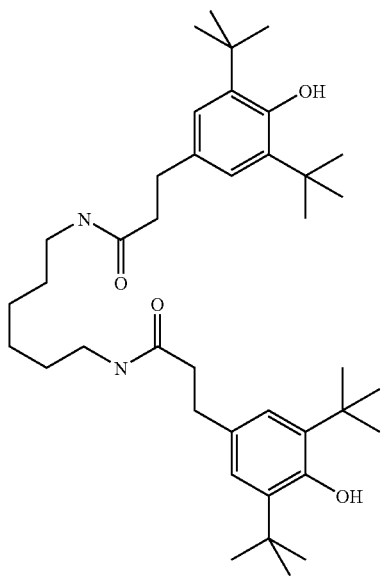

TABLE B-continued
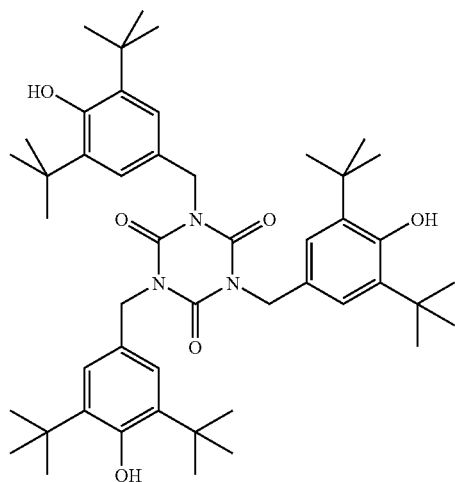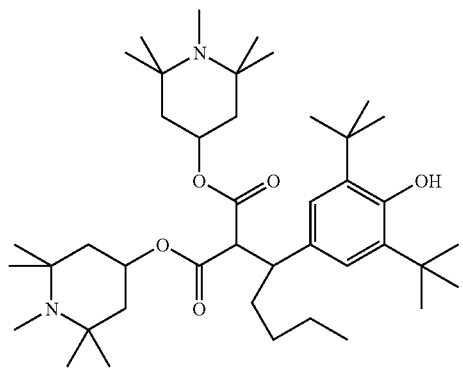
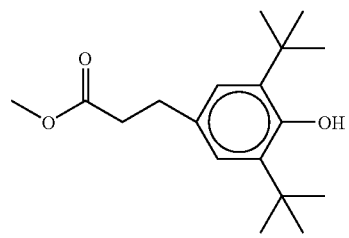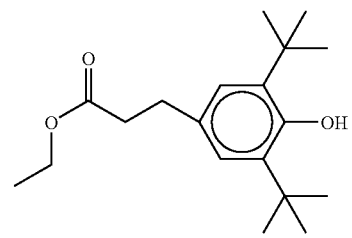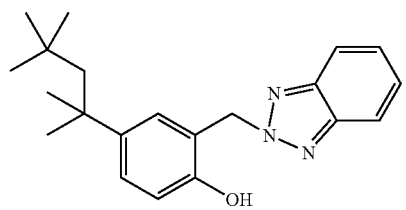
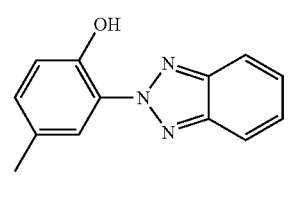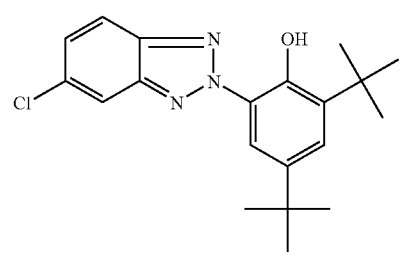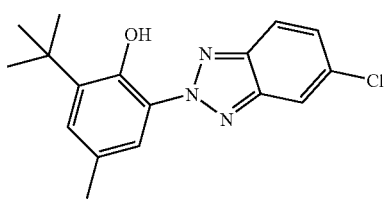
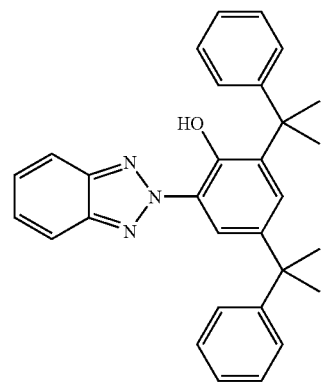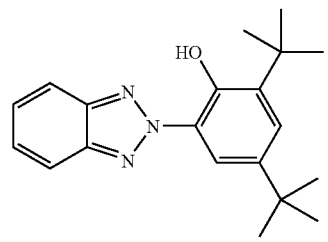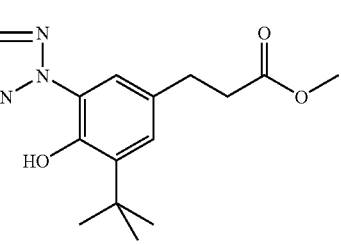

TABLE B-continued
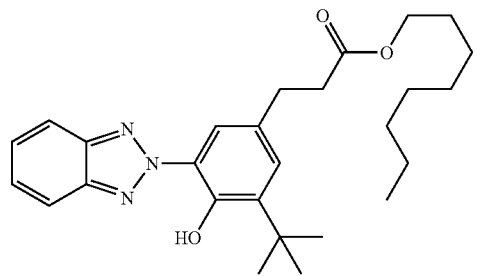
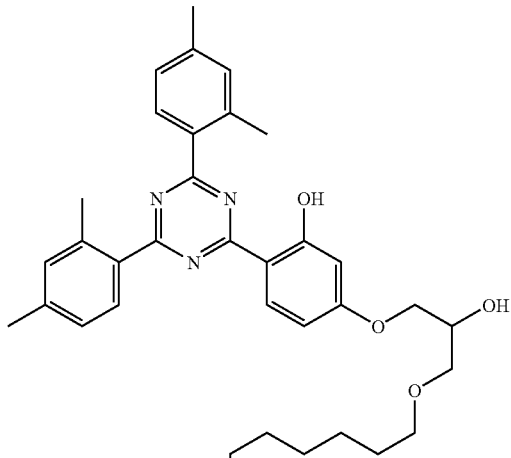
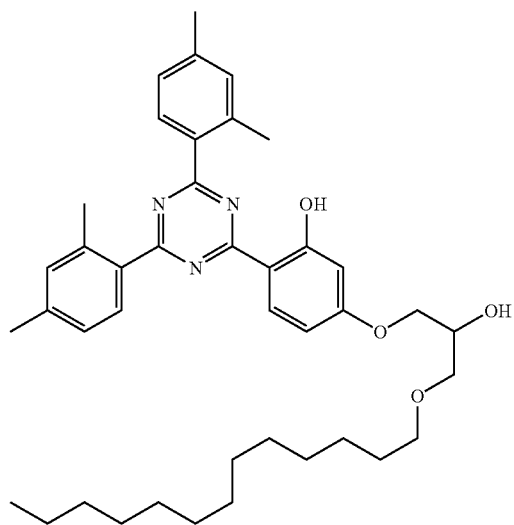
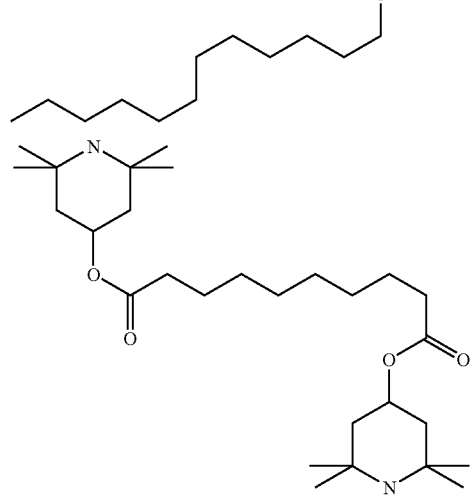
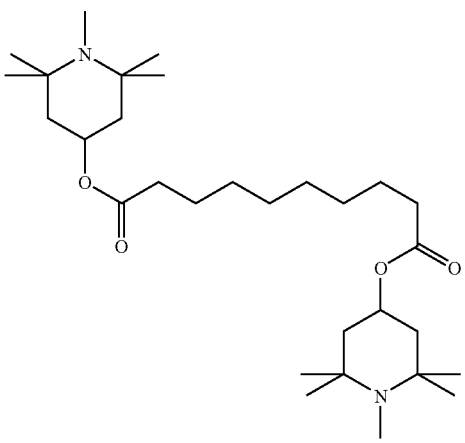
(n = 1-12)
The compositions consist of a plurality of compounds, preferably of 3 to 30, particularly preferably of 6 to 20 and very particularly preferably of 10 to 16 compounds, which are mixed in a conventional manner. In general, the desired amount of the components used in lesser amount is dissolved in the components making up the principal constituent, advantageously at elevated temperature. If the selected temperature is above the clearing point of the principal constituent, the completion of the dissolution process is particularly easy to observe. However, it is also possible to prepare the liquid-crystal mixtures by other conventional methods, for example using premixes or from a so-called "multibottle system".

By means of suitable additives, the liquid-crystal phases according to the invention can be modified in such a way that they can be employed in any type of ECB, VAN, IPS, GH or ASM-PA LCD display known to date.

The following examples serve to illustrate the invention without restricting it. In the examples, the melting point T (C,N), the transition from the smectic (S) to the nematic (N) phase T (S,N) and clearing point T (N,I) of a liquid-crystal substance are indicated in degrees Celsius.

Furthermore:

| | | |
|---|---|---|
| $V_o$ | denotes the threshold voltage, capacitive [V] at 20° C. | |
| $\Delta n$ 589 nm | denotes the optical anisotropy, measured at 20° C. and | |
| $\Delta \epsilon$ | denotes the dielectric anisotropy at 20° C. and 1 kHz | |
| cp. | denotes clearing point [° C.] | |
| $\gamma_1$ | denotes rotational viscosity, measured at 20° C. [mPa·s] | |
| LTS | denotes low-temperature stability, determined in test cells | |

HR (20) denotes voltage holding ratio at 20° C. [%]
HR (100) denotes voltage holding ratio after 5 min at 100° C. [%]
HR (UV) denotes voltage holding ratio after UV exposure [%]

In order to measure the voltage holding ratio, cells with an Al-3046 alignment layer are used.

The display for measurement of the threshold voltage has two plane-parallel outer plates at a separation of 20 µm and electrode layers with overlying SE-1211 (Nissan Chemicals) alignment layers on the insides of the outer plates, which effect a homeotropic alignment of the liquid crystals.

USE EXAMPLES

Example M1

| | | | |
|---|---|---|---|
| CY-3-O4 | 16.00% | Clearing point [° C.]: | 71.0 |
| CY-5-O2 | 13.00% | Δn [589 nm, 20° C.]: | 0.0822 |
| CCY-3-O2 | 14.00% | $\epsilon_\parallel$ [kHz, 20° C.]: | 3.6 |
| CCY-2-1 | 13.00% | Δε [kHz, 20° C.]: | −3.3 |
| CCY-3-1 | 10.00% | $K_1$ [pN, 20° C.]: | 13.3 |
| CCH-35 | 10.00% | $K_3$ [pN, 20° C.]: | 14.0 |
| CCH-303 | 5.00% | $\gamma_1$ [mPa·s, 20° C.]: | 125 |
| CCH-301 | 12.00% | $V_0$ [V]: | 2.16 |
| BCH-32 | 7.00% | LTS: | nematic > 1000 h at −30° C. |
| | | LTS: | nematic > 350 h at −40° C. |
| | | HR (100): | 93.0% |

Example M2

| | | | |
|---|---|---|---|
| CY-3-O4 | 18.00% | Clearing point [° C.]: | 70.5 |
| CY-5-O4 | 14.00% | Δn [589 nm, 20° C.]: | 0.0825 |
| CCY-3-O2 | 5.00% | $\epsilon_\parallel$ [kHz, 20° C.]: | 3.4 |
| CCY-5-O2 | 8.00% | Δε [kHz, 20° C.]: | −3.1 |
| CPY-2-O2 | 3.00% | $K_1$ [pN, 20° C.]: | 14.0 |
| CPY-3-O2 | 10.00% | $K_3$ [pN, 20° C.]: | 14.4 |
| CC-3-V1 | 12.00% | $\gamma_1$ [mPa·s, 20° C.]: | 102 |
| CC-5-V | 15.00% | $V_0$ [V]: | 2.27 |
| CC-3-2V | 10.00% | LTS: | nematic > 1000 h at −40° C. |
| CCH-35 | 5.00% | | |
| | | HR (100): | 94.5% |

Example M3

| | | | |
|---|---|---|---|
| CY-3-O4 | 15.00% | Clearing point [° C.]: | 70.5 |
| CY-5-O5 | 15.00% | Δn [589 nm, 20° C.]: | 0.0952 |
| CCY-3-O2 | 10.00% | $\epsilon_\parallel$ [kHz, 20° C.]: | 3.5 |
| CCY-3-1 | 10.00% | Δε [kHz, 20° C.]: | −3.1 |
| PCH-302 | 6.00% | $K_1$ [pN, 20° C.]: | 13.9 |
| CC-5-V | 6.00% | $K_3$ [pN, 20° C.]: | 14.6 |
| CC-3-V1 | 12.00% | $\gamma_1$ [mPa·s, 20° C.]: | 133 |
| CCH-35 | 5.00% | $V_0$ [V]: | 2.28 |
| CPY-2-1 | 7.00% | LTS: | nematic > 1000 h at −30° C. |
| CPY-3-1 | 7.00% | | |
| CPY-5-1 | 7.00% | | |

Example M4

| | | | |
|---|---|---|---|
| CY-3-O4 | 14.00% | Clearing point [° C.]: | 69.5 |
| CY-5-O2 | 8.00% | Δn [589 nm, 20° C.]: | 0.1005 |
| CY-5-O4 | 15.00% | $\epsilon_\parallel$ [kHz, 20° C.]: | 3.6 |
| BCH-32 | 8.00% | Δε [kHz, 20° C.]: | −3.3 |
| CCP-V2-1 | 7.00% | $K_1$ [pN, 20° C.]: | 12.5 |
| CC-3-V1 | 8.00% | $K_3$ [pN, 20° C.]: | 13.5 |
| CC-3-V | 18.00% | $\gamma_1$ [mPa·s, 20° C.]: | 106 |
| CPY-2-O2 | 10.00% | $V_0$ [V]: | 2.14 |
| CPY-3-O2 | 12.00% | LTS: | nematic > 1000 h at −40° C. |

Example M5

| | | | |
|---|---|---|---|
| CY-3-O4 | 15.00% | Clearing point [° C.]: | 73.5 |
| CY-5-O4 | 13.00% | Δn [589 nm, 20° C.]: | 0.1198 |
| PCH-53 | 5.00% | $\epsilon_\parallel$ [kHz, 20° C.]: | 3.7 |
| CCP-V-1 | 6.00% | Δε [kHz, 20° C.]: | −3.3 |
| BCH-32 | 8.00% | $K_1$ [pN, 20° C.]: | 11.9 |
| CC-3-V1 | 8.00% | $K_3$ [pN, 20° C.]: | 12.0 |
| CC-5-V | 9.00% | $\gamma_1$ [mPa·s, 20° C.]: | 150 |
| CPY-2-O2 | 12.00% | $V_0$ [V]: | 2.01 |
| CPY-3-O2 | 12.00% | | |
| YPY-4-1 | 6.00% | | |
| YPY-4-4 | 6.00% | | |

Example M6

| | | | |
|---|---|---|---|
| CY-3-O4 | 11.00% | Clearing point [° C.]: | 71.0 |
| CY-5-O2 | 11.00% | Δn [589 nm, 20° C.]: | 0.1202 |
| CPY-2-O2 | 12.00% | $\epsilon_\parallel$ [kHz, 20° C.]: | 3.7 |

-continued

| | | | |
|---|---|---|---|
| CPY-3-O2 | 9.00% | Δε [kHz, 20° C.]: | −3.0 |
| BCH-32 | 9.00% | $K_1$ [20° C.]: | 12.4 |
| CCH-301 | 12.00% | $K_3$ [20° C.]: | 11.7 |
| CCH-303 | 12.00% | $γ_1$ [mPa · s, 20° C.]: | 125 |
| CCH-35 | 6.00% | $V_0$ [V]: | 2.10 |
| PYP-2-3 | 6.00% | LTS: | nematic > 1000 h at |
| PYP-2-4 | 12.00% | | −30° C. |

Example M8

| | | | |
|---|---|---|---|
| CY-3-O4 | 20.00% | Clearing point [° C.]: | 70.0 |
| CY-5-O4 | 5.00% | Δn [589 nm, 20° C.]: | 0.1201 |
| CPY-2-O2 | 12.00% | $ε_∥$ [kHz, 20° C.]: | 3.6 |
| CPY-3-O2 | 12.00% | Δε [kHz, 20° C.]: | −3.2 |
| PYP-2-3 | 10.00% | $K_1$ [20° C.]: | 11.7 |
| PYP-2-4 | 10.00% | $K_3$ [20° C.]: | 12.4 |
| CC-3-V1 | 12.00% | $γ_1$ [mPa · s, 20° C.]: | 116 |
| CC-4-V | 14.00% | $V_0$ [V]: | 2.09 |
| CCH-34 | 5.00% | | |

Example M9

| | | | |
|---|---|---|---|
| BCH-32 | 10.00% | Clearing point [° C.]: | 72.0 |
| CCP-V-1 | 10.00% | Δn [589 nm, 20° C.]: | 0.1512 |
| CC-3-V1 | 12.00% | $ε_∥$ [kHz, 20° C.]: | 3.7 |
| CPY-2-O2 | 12.00% | Δε [kHz, 20° C.]: | −3.6 |
| CPY-3-O2 | 13.00% | $K_1$ [20° C.]: | 15.0 |
| B-302FF | 19.00% | $K_3$ [20° C.]: | 15.5 |
| B-502FF | 17.00% | $γ_1$ [mPa · s, 20° C.]: | 143 |
| PP-1-4 | 7.00% | $V_0$ [V]: | 2.20 |
| | | LTS: | nematic > 1000 h at −30° C. |

Example M10

| | | | |
|---|---|---|---|
| CY-3-O2 | 18.00% | Clearing point [° C.]: | 71.0 |
| CY-3-O4 | 5.00% | Δn [589 nm, 20° C.]: | 0.0821 |
| CY-5-O2 | 12.00% | $ε_∥$ [kHz, 20° C.]: | 3.7 |
| CCY-3-O2 | 12.00% | Δε [kHz, 20° C.]: | −3.9 |
| CCY-5-O2 | 3.00% | $K_1$ [20° C.]: | 13.1 |
| CCY-2-1 | 4.00% | $K_3$ [20° C.]: | 14.9 |
| CCY-3-1 | 8.00% | $γ_1$ [mPa · s, 20° C.]: | 130 |
| CPY-3-O2 | 3.00% | $V_0$ [V]: | 2.07 |
| CCH-35 | 5.00% | LTS: | nematic > 1000 h at −40° C. |
| PCH-302 | 8.00% | HR (100° C.): | 93% |
| CH-33 | 3.00% | | |
| CH-43 | 4.00% | | |
| CC-5-V | 15.00% | | |

Example M11

| | | | |
|---|---|---|---|
| CC-3-V1 | 7.00% | $K_3$ [20° C.]: | 14.1 |
| CC-5-V | 18.00% | $γ_1$ [mPa · s, 20° C.]: | 116 |
| CPY-3-O2 | 4.00% | $V_0$ [V]: | 1.94 |
| CCY-V-O2 | 15.00% | LTS: | nematic > 1000 h at −30° C. |
| | | LTS: | nematic > 600 h at −40° C. |
| | | HR (100° C.): | 94% |

Example M12

| | | | |
|---|---|---|---|
| CY-3-O4 | 17.00% | Clearing point [° C.]: | 70.5 |
| CY-5-O2 | 9.00% | Δn [589 nm, 20° C.]: | 0.0993 |
| CY-5-O4 | 14.00% | $ε_∥$ [kHz, 20° C.]: | 4.0 |
| CPY-2-O2 | 7.00% | Δε [kHz, 20° C.]: | −4.2 |
| CPY-3-O2 | 7.00% | $K_1$ [20° C.]: | 11.5 |
| CCP-V-1 | 12.00% | $K_3$ [20° C.]: | 14.3 |
| CCH-35 | 5.00% | $γ_1$ [mPa · s, 20° C.]: | 187 |
| CC-3-V1 | 9.00% | $V_0$ [V]: | 1.95 |
| CPQIY-3-O4 | 10.00% | LTS: | nematic > 1000 h at −30° C. |
| CPQIY-5-O4 | 10.00% | | |

Example M13

| | | | |
|---|---|---|---|
| CC-5-V | 11.00% | Clearing point [° C.]: | 73.0 |
| PCH-53 | 13.00% | Δn [589 nm, 20° C.]: | 0.0985 |
| CY-3-O4 | 12.00% | $ε_∥$ [kHz, 20° C.]: | 3.7 |
| CY-5-O4 | 12.00% | Δε [kHz, 20° C.]: | −4.0 |
| CCY-2-O2 | 12.00% | $K_1$ [20° C.]: | 13.8 |
| CCY-3-O2 | 12.00% | $K_3$ [20° C.]: | 14.2 |
| CCY-5-O2 | 8.00% | $γ_1$ [mPa · s, 20° C.]: | 163 |
| CCY-2-1 | 10.00% | $V_0$ [V]: | 1.98 |
| PYP-2-3 | 10.00% | | |

Example M14

| | | | |
|---|---|---|---|
| CY-3-O4 | 16.00% | Clearing point [° C.]: | 71.0 |
| CY-5-O4 | 15.00% | Δn [589 nm, 20° C.]: | 0.1014 |
| CY-5-O2 | 8.00% | $ε_∥$ [kHz, 20° C.]: | 3.8 |
| CCY-3-O2 | 6.00% | Δε [kHz, 20° C.]: | −4.0 |
| BCH-32 | 7.00% | $K_1$ [20° C.]: | 13.9 |
| CCH-35 | 5.00% | $K_3$ [20° C.]: | 13.0 |
| CC-3-2V | 10.00% | $γ_1$ [mPa · s, 20° C.]: | 141 |
| CC-5-V | 9.00% | $V_0$ [V]: | 1.89 |
| CPY-2-O2 | 12.00% | LTS: | nematic > 1000 h at −30° C. |
| CPY-3-O2 | 12.00% | | |

| | | | |
|---|---|---|---|
| CY-3-O4 | 20.00% | Clearing point [° C.]: | 73.5 |
| CY-5-O2 | 9.00% | Δn [589 nm, 20° C.]: | 0.1202 |
| CY-5-O4 | 4.00% | $ε_∥$ [kHz, 20° C.]: | 3.7 |
| BCH-32 | 10.00% | Δε [kHz, 20° C.]: | −3.8 |
| PGIGI-3-F | 2.00% | $K_1$ [20° C.]: | 13.0 |
| CC-3-V1 | 11.00% | $K_3$ [20° C.]: | 13.1 |
| CC-5-V | 10.00% | $γ_1$ [mPa · s, 20° C.]: | 153 |

-continued

| | | | | |
|---|---|---|---|---|
| CPY-2-O2 | 14.00% | $V_0$ [V]: | | 1.95 |
| CPY-3-O2 | 12.00% | LTS: | | nematic > 1000 h at |
| YPY-4-1 | 2.00% | | | −20° C. |
| YPY-4-4 | 2.00% | | | |
| YPY-5-5 | 2.00% | | | |
| YPY-4-2V | 2.00% | | | |

Example M15

| | | | |
|---|---|---|---|
| CY-3-O4 | 16.00% | Clearing point [° C.]: | 69.0 |
| CY-5-O2 | 8.00% | Δn [589 nm, 20° C.]: | 0.1249 |
| CY-5-O4 | 16.00% | $\epsilon_\parallel$ [kHz, 20° C.]: | 3.9 |
| BCH-32 | 8.00% | Δε [kHz, 20° C.]: | −4.1 |
| CC-5-V | 8.00% | $K_1$ [20° C.]: | 12.7 |
| CC-3-V1 | 8.00% | $K_3$ [20° C.]: | 13.1 |
| CPY-2-O2 | 11.00% | $\gamma_1$ [mPa·s, 20° C.]: | 153 |
| CPY-3-O2 | 11.00% | $V_0$ [V]: | 1.89 |
| PYP-2-3 | 14.00% | LTS: | nematic > 1000 h at −40° C. |

Example M16

| | | | |
|---|---|---|---|
| CY-3-O4 | 20.00% | Clearing point [° C.]: | 71.0 |
| CY-5-O2 | 8.00% | Δn [589 nm, 20° C.]: | 0.1210 |
| CY-5-O4 | 12.00% | $\epsilon_\parallel$ [kHz, 20° C.]: | 4.0 |
| BCH-32 | 9.00% | Δε [kHz, 20° C.]: | −4.1 |
| CCP-V-1 | 7.00% | $K_1$ [20° C.]: | 12.4 |
| PGIGI-3-F | 7.00% | $K_3$ [20° C.]: | 13.8 |
| CC-3-V1 | 8.00% | $\gamma_1$ [mPa·s, 20° C.]: | 171 |
| PCH-53 | 3.00% | $V_0$ [V]: | 1.94 |
| CPY-2-O2 | 14.00% | LTS: | nematic > 1000 h at −30° C. |
| CPY-3-O2 | 12.00% | LTS: | nematic > 600 h at −40° C. |

Example M17

| | | | |
|---|---|---|---|
| CY-3-O4 | 16.00% | Clearing point [° C.]: | 68.5 |
| CY-5-O2 | 8.00% | Δn [589 nm, 20° C.]: | 0.1515 |
| BCH-32 | 8.00% | $\epsilon_\parallel$ [kHz, 20° C.]: | 4.2 |
| CC-3-V1 | 10.00% | Δε [kHz, 20° C.]: | −4.0 |
| CPY-2-O2 | 12.00% | $K_1$ [20° C.]: | 13.0 |
| CPY-3-O2 | 12.00% | $K_3$ [20° C.]: | 14.4 |
| PYP-2-3 | 11.00% | $\gamma_1$ [mPa·s, 20° C.]: | 161 |
| PYP-3-3 | 10.00% | $V_0$ [V]: | 2.01 |
| B-11FF | 13.00% | LTS: | nematic > 1000 h at −40° C. |

Example M18

| | | | |
|---|---|---|---|
| CC-5-V | 7.00% | Clearing point [° C.]: | 70.0 |
| CCH-34 | 6.00% | Δn [589 nm, 20° C.]: | 0.0796 |
| CY-3-O4 | 22.00% | $\epsilon_\parallel$ [kHz, 20° C.]: | 4.0 |
| CY-5-O4 | 21.00% | Δε [kHz, 20° C.]: | −4.8 |
| CCY-2-O2 | 8.00% | $K_1$ [20° C.]: | 12.9 |
| CCY-3-O2 | 6.00% | $K_3$ [20° C.]: | 12.6 |
| CCY-5-O2 | 7.00% | $\gamma_1$ [mPa·s, 20° C.]: | 172 |
| CCY-2-1 | 10.00% | $V_0$ [V]: | 1.72 |
| CCY-3-1 | 8.00% | LTS: | nematic > 1000 h at −40° C. |
| CH-33 | 2.00% | | |
| CH-43 | 3.00% | | |

Example M19

| | | | |
|---|---|---|---|
| CC-5-V | 13.00% | Clearing point [° C.]: | 73.0 |
| CY-3-O4 | 20.00% | Δn [589 nm, 20° C.]: | 0.0830 |
| CY-5-O4 | 20.00% | $\epsilon_\parallel$ [kHz, 20° C.]: | 3.9 |
| CCY-2-O2 | 8.00% | Δε [kHz, 20° C.]: | −5.1 |
| CCY-3-O2 | 11.00% | $K_1$ [20° C.]: | 13.2 |
| CCY-5-O2 | 8.00% | $K_3$ [20° C.]: | 14.0 |
| CCY-2-1 | 10.00% | $\gamma_1$ [mPa·s, 20° C.]: | 184 |
| CCY-3-1 | 10.00% | $V_0$ [V]: | 1.76 |
| | | LTS: | nematic > 1000 h at −20° C. |
| | | LTS: | nematic > 800 h at −30° C. |

Example M20

| | | | |
|---|---|---|---|
| PCH-53 | 5.00% | Clearing point [° C.]: | 70.5 |
| CY-3-O4 | 22.00% | Δn [589 nm, 20° C.]: | 0.0951 |
| CY-5-O4 | 20.00% | $\epsilon_\parallel$ [kHz, 20° C.]: | 4.1 |
| CCY-2-O2 | 9.00% | Δε [kHz, 20° C.]: | −4.9 |
| CCY-3-O2 | 10.00% | $K_1$ [20° C.]: | 12.9 |
| CCY-5-O2 | 5.00% | $K_3$ [20° C.]: | 13.2 |
| CCY-2-1 | 12.00% | $\gamma_1$ [mPa·s, 20° C.]: | 210 |
| CCY-3-1 | 8.00% | $V_0$ [V]: | 1.73 |
| BCH-32 | 4.00% | LTS: | nematic > 1000 h at −40° C. |
| BCH-52 | 4.00% | | |
| PGIGI-3-F | 1.00% | | |

Example M21

| | | | |
|---|---|---|---|
| CY-3-O4 | 16.00% | Clearing point [° C.]: | 70.0 |
| CY-5-O2 | 16.00% | Δn [589 nm, 20° C.]: | 0.1019 |
| CY-5-O4 | 13.00% | $\epsilon_\parallel$ [kHz, 20° C.]: | 4.0 |
| CCY-3-O2 | 9.00% | Δε [kHz, 20° C.]: | −5.0 |
| CPY-2-O2 | 12.00% | $K_1$ [20° C.]: | 13.8 |
| CPY-3-O2 | 12.00% | $K_3$ [20° C.]: | 14.5 |
| CC-3-V1 | 10.00% | $\gamma_1$ [mPa·s, 20° C.]: | 165 |
| CCH-35 | 9.00% | $V_0$ [V]: | 1.79 |
| BCH-32 | 3.00% | | |

Example M22

| | | | |
|---|---|---|---|
| CCY-3-O2 | 15.00% | Clearing point [° C.]: | 87.0 |
| CCY-5-O2 | 12.00% | Δn [589 nm, 20° C.]: | 0.0797 |
| CCY-2-1 | 6.00% | $\epsilon_\parallel$ [kHz, 20° C.]: | 3.2 |
| CCY-3-1 | 13.00% | Δε [kHz, 20° C.]: | −3.1 |
| CY-5-O2 | 17.00% | $K_1$ [20° C.]: | 17.0 |
| CCH-301 | 7.00% | $K_3$ [20° C.]: | 17.8 |
| CCH-35 | 20.00% | $\gamma_1$ [mPa·s, 20° C.]: | 147 |
| PCH-53 | 10.00% | $V_0$ [V]: | 2.53 |

Example M23

| | | | |
|---|---|---|---|
| BCH-32F | 2.50% | Clearing point [° C.]: | 92.0 |
| CCH-301 | 16.50% | $\Delta n$ [589 nm, 20° C.]: | 0.0827 |
| CCH-34 | 5.00% | $\epsilon_{\parallel}$ [kHz, 20° C.]: | 3.4 |
| CCH-35 | 5.00% | $\Delta\epsilon$ [kHz, 20° C.]: | −3.0 |
| CCY-2-1 | 14.00% | $K_1$ [20° C.]: | 16.4 |
| CCY-3-O2 | 13.50% | $K_3$ [20° C.]: | 17.8 |
| CCY-3-1 | 14.00% | $\gamma_1$ [mPa·s, 20° C.]: | 154 |
| CCY-5-O2 | 13.50% | $V_0$ [V]: | 2.58 |
| PCH-301 | 8.50% | | |
| CY-3-O2 | 7.50% | | |

Example M24

| | | | |
|---|---|---|---|
| CY-3-O4 | 8.00% | Clearing point [° C.]: | 91.0 |
| CY-5-O2 | 3.00% | $\Delta n$ [589 nm, 20° C.]: | 0.0822 |
| CCY-3-O2 | 11.00% | $\epsilon_{\parallel}$ [kHz, 20° C.]: | 3.3 |
| CCY-3-O3 | 12.00% | $\Delta\epsilon$ [kHz, 20° C.]: | −3.2 |
| CCY-4-O2 | 12.00% | $K_1$ [20° C.]: | 15.4 |
| CPY-2-O2 | 10.00% | $K_3$ [20° C.]: | 15.9 |
| CC-4-V | 17.00% | $\gamma_1$ [mPa·s, 20° C.]: | 117 |
| CC-3-V1 | 12.00% | $V_0$ [V]: | 2.36 |
| CCH-35 | 4.00% | LTS: | nematic > 1000 h at −20° C. |
| CCH-301 | 11.00% | | |

Example M25

| | | | |
|---|---|---|---|
| CY-3-O4 | 12.00% | Clearing point [° C.]: | 90.0 |
| CCY-3-O3 | 12.00% | $\Delta n$ [589 nm, 20° C.]: | 0.1019 |
| CCY-4-O2 | 2.00% | $\epsilon_{\parallel}$ [kHz, 20° C.]: | 3.4 |
| CPY-2-O2 | 12.00% | $\Delta\epsilon$ [kHz, 20° C.]: | −3.0 |
| CPY-3-O2 | 12.00% | $K_1$ [20° C.]: | 15.2 |
| CCH-301 | 11.00% | $K_3$ [20° C.]: | 15.8 |
| CC-5-V | 20.00% | $\gamma_1$ [mPa·s, 20° C.]: | 135 |
| CC-3-V1 | 10.00% | $V_0$ [V]: | 2.43 |
| PYP-2-3 | 2.00% | | |
| PYP-2-4 | 4.00% | | |
| CCPC-33 | 3.00% | | |

Example M26

| | | | |
|---|---|---|---|
| CY-3-O4 | 15.00% | Clearing point [° C.]: | 90.5 |
| CY-5-O4 | 11.00% | $\Delta n$ [589 nm, 20° C.]: | 0.1249 |
| CY-5-O2 | 5.00% | $\epsilon_{\parallel}$ [kHz, 20° C.]: | 3.7 |
| CPY-2-O2 | 12.00% | $\Delta\epsilon$ [kHz, 20° C.]: | −3.3 |
| CPY-3-O2 | 12.00% | $K_1$ [20° C.]: | 15.2 |
| BCH-32 | 8.00% | $K_3$ [20° C.]: | 15.6 |
| PGIGI-3-F | 8.00% | $\gamma_1$ [mPa·s, 20° C.]: | 188 |
| CCP-V-1 | 8.00% | $V_0$ [V]: | 2.38 |
| CCP-V2-1 | 8.00% | LTS: | nematic > 1000 h at −30° C. |
| CC-5-V | 9.00% | HR (100° C.): | 94% |
| CC-3-V1 | 2.00% | | |
| CBC-33 | 2.00% | | |

Example M27

| | | | |
|---|---|---|---|
| CY-3-O2 | 12.00% | Clearing point [° C.]: | 91.0 |
| CY-5-O2 | 11.00% | $\Delta n$ [589 nm, 20° C.]: | 0.0829 |
| CCY-3-O2 | 14.00% | $\epsilon_{\parallel}$ [kHz, 20° C.]: | 3.6 |
| CCY-5-O2 | 15.00% | $\Delta\epsilon$ [kHz, 20° C.]: | −4.2 |
| CCY-2-1 | 10.00% | $K_1$ [20° C.]: | 16.6 |
| CCY-3-1 | 14.00% | $K_3$ [20° C.]: | 18.4 |
| CCH-34 | 6.00% | $\gamma_1$ [mPa·s, 20° C.]: | 185 |
| CCH-35 | 5.00% | | |
| CCH-301 | 4.00% | | |
| CCH-303 | 5.00% | | |
| CCH-501 | 4.00% | | |

Example M28

| | | | |
|---|---|---|---|
| CY-3-O2 | 20.00% | Clearing point [° C.]: | 91.0 |
| CY-5-O2 | 5.00% | $\Delta n$ [589 nm, 20° C.]: | 0.0821 |
| CCY-3-O2 | 12.00% | $\epsilon_{\parallel}$ [kHz, 20° C.]: | 3.5 |
| CCY-5-O2 | 7.00% | $\Delta\epsilon$ [kHz, 20° C.]: | −4.1 |
| CCY-3-O3 | 12.00% | $K_1$ [20° C.]: | 16.2 |
| CCY-4-O2 | 11.00% | $K_3$ [20° C.]: | 18.1 |
| CC-5-V | 20.00% | $\gamma_1$ [mPa·s, 20° C.]: | 148 |
| CC-3-V1 | 9.00% | $V_0$ [V]: | 2.21 |
| CCH-35 | 4.00% | LTS: | nematic > 1000 h at −20° C. |

Example M29

| | | | |
|---|---|---|---|
| CY-5-O2 | 9.00% | Clearing point [° C.]: | 90.5 |
| CY-5-O4 | 15.00% | $\Delta n$ [589 nm, 20° C.]: | 0.1023 |
| CCY-3-O3 | 12.00% | $\epsilon_{\parallel}$ [kHz, 20° C.]: | 3.5 |
| CCY-4-O2 | 10.00% | $\Delta\epsilon$ [kHz, 20° C.]: | −4.1 |
| CCY-5-O2 | 10.00% | $K_1$ [20° C.]: | 17.3 |
| CPY-2-O2 | 2.00% | $K_3$ [20° C.]: | 16.4 |
| CPY-3-O2 | 12.00% | $\gamma_1$ [mPa·s, 20° C.]: | 211 |
| CCH-35 | 7.00% | $V_0$ [V]: | 2.10 |
| CCH-303 | 4.00% | LTS: | nematic > 1000 h at −20° C. |
| PCH-53 | 12.00% | | |
| BCH-32 | 7.00% | HR (100° C.): | 91% |

Example M30

| | | | |
|---|---|---|---|
| CY-3-O4 | 5.00% | Clearing point [° C.]: | 91.5 |
| CY-5-O4 | 20.00% | $\Delta n$ [589 nm, 20° C.]: | 0.1015 |
| CCY-3-O3 | 12.00% | $\epsilon_{\parallel}$ [kHz, 20° C.]: | 3.5 |
| CCY-4-O2 | 10.00% | $\Delta\epsilon$ [kHz, 20° C.]: | −4.2 |
| CCY-5-O2 | 11.00% | $K_1$ [20° C.]: | 16.6 |
| CPY-3-O2 | 10.00% | $K_3$ [20° C.]: | 16.3 |
| PYP-2-4 | 7.00% | $\gamma_1$ [mPa·s, 20° C.]: | 211 |
| CC-3-V1 | 11.00% | $V_0$ [V]: | 2.10 |
| CC-5-V | 11.00% | LTS: | nematic > 1000 h at −20° C. |
| PCH-53 | 3.00% | | |
| | | HR (100° C.): | 94% |

Example M31

| | | | |
|---|---|---|---|
| CY-3-O4 | 14.00% | Clearing point [° C.]: | 90.0 |
| CY-5-O2 | 14.00% | Δn [589 nm, 20° C.]: | 0.1168 |
| CY-5-O4 | 4.00% | $\epsilon_\parallel$ [kHz, 20° C.]: | 3.7 |
| CCY-3-O2 | 6.00% | Δε [kHz, 20° C.]: | −4.2 |
| CCY-5-O2 | 7.00% | $K_1$ [20° C.]: | 15.3 |
| PGIGI-3-F | 2.00% | $K_3$ [20° C.]: | 17.7 |
| BCH-32 | 10.00% | $\gamma_1$ [mPa·s, 20° C.]: | 198 |
| CPY-2-O2 | 10.00% | $V_0$ [V]: | 2.15 |
| CPY-3-O2 | 14.00% | | |
| CCP-V-1 | 2.00% | | |
| CC-5-V | 5.00% | | |
| CC-3-V1 | 12.00% | | |

Example M32

| | | | |
|---|---|---|---|
| CY-3-O4 | 20.00% | Clearing point [° C.]: | 87.0 |
| CY-5-O2 | 12.00% | Δn [589 nm, 20° C.]: | 0.0808 |
| CY-5-O4 | 20.00% | $\epsilon_\parallel$ [kHz, 20° C.]: | 3.9 |
| CCY-3-O2 | 7.00% | Δε [kHz, 20° C.]: | −5.0 |
| CCY-5-O2 | 11.00% | $K_1$ [20° C.]: | 13.6 |
| CCH-301 | 5.00% | $K_3$ [20° C.]: | 15.1 |
| CH-33 | 4.00% | $\gamma_1$ [mPa·s, 20° C.]: | 265 |
| CH-35 | 4.00% | $V_0$ [V]: | 1.82 |
| CH-43 | 4.00% | | |
| CH-45 | 4.00% | | |
| CCPC-33 | 3.00% | | |
| CCPC-34 | 3.00% | | |
| CCPC-35 | 3.00% | | |

Example M33

| | | | |
|---|---|---|---|
| CY-3-O4 | 14.00% | Clearing point [° C.]: | 86.0 |
| CY-5-O2 | 10.00% | Δn [589 nm, 20° C.]: | 0.1023 |
| CY-5-O4 | 16.00% | $\epsilon_\parallel$ [kHz, 20° C.]: | 3.9 |
| CCY-2-O2 | 6.00% | Δε [kHz, 20° C.]: | −5.1 |
| CCY-3-O2 | 12.00% | $K_1$ [20° C.]: | 15.2 |
| CCY-5-O2 | 8.00% | $K_3$ [20° C.]: | 16.2 |
| CCY-2-1 | 8.00% | $\gamma_1$ [mPa·s, 20° C.]: | 257 |
| CCY-3-1 | 12.00% | $V_0$ [V]: | 1.89 |
| BCH-32 | 8.00% | LTS: | nematic > 1000 h at −20° C. |
| CCP-V-1 | 4.00% | LTS: | nematic > 760 h at −30° C. |
| PGIGI-3-F | 2.00% | LTS: | nematic > 500 h at −40° C. |
| | | HR (20° C.): | 98% |
| | | HR (100° C.): | 91% |

Example M34

| | | | |
|---|---|---|---|
| CY-3-O4 | 10.00% | Clearing point [° C.]: | 90.0 |
| CY-5-O4 | 14.00% | Δn [589 nm, 20° C.]: | 0.1204 |
| CY-5-O2 | 13.00% | $\epsilon_\parallel$ [kHz, 20° C.]: | 3.9 |
| CCY-3-O2 | 14.00% | Δε [kHz, 20° C.]: | −5.0 |
| CCY-5-O2 | 1.00% | $K_1$ [20° C.]: | 14.7 |
| CBC-33 | 6.00% | $K_3$ [20° C.]: | 16.8 |
| CC-5-V | 11.00% | $\gamma_1$ [mPa·s, 20° C.]: | 265 |
| PGIGI-3-F | 7.00% | $V_0$ [V]: | 1.94 |
| CPY-2-O2 | 12.00% | LTS: | nematic > 1000 h at −40° C. |
| CPY-3-O2 | 12.00% | | |

Example M35

| | | | |
|---|---|---|---|
| CY-3-O2 | 13.00% | Clearing point [° C.]: | 79.5 |
| CY-5-O2 | 5.00% | Δn [589 nm, 20° C.]: | 0.0788 |
| CCY-4-O2 | 10.00% | $\epsilon_\parallel$ [kHz, 20° C.]: | 3.4 |
| CCY-3-O3 | 12.00% | Δε [kHz, 20° C.]: | −3.1 |
| CCY-2-O2V | 11.00% | $K_1$ [pN, 20° C.]: | 13.9 |
| CPY-2-O2 | 6.00% | $K_3$ [pN, 20° C.]: | 13.6 |
| CCH-303 | 5.00% | $\gamma_1$ [mPa·s, 20° C.]: | 107 |
| CC-5-V | 18.00% | $V_0$ [V]: | 2.21 |
| CC-3-V1 | 12.00% | | |
| CCH-34 | 5.00% | | |
| PCH-301 | 3.00% | | |

The invention claimed is:

1. A liquid-crystalline medium based on a mixture of polar compounds having negative dielectric anisotropy (Δε), which has a value for the ratio $\gamma_1/\Delta n^2$ in the range 6-45 Pa·s with a clearing point of ≧60° C. and a Δε of ≦−2.3, and comprises a compound of formula CC-3-V

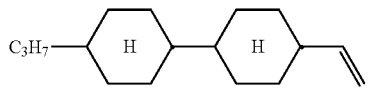

in a concentration of >20%,
and
one or both compounds of the following formulae

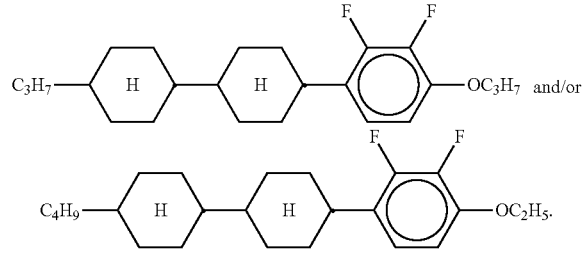

2. A liquid-crystalline medium according to claim 1, which has a clearing point of 60-90° C.

3. A liquid-crystalline medium according to claim 1, which has a Δε value of −2.3 to −5.5.

4. A liquid-crystalline medium according to claim 1, which having a clearing point of 70° C.±5° C. and a Δε of −3.0±0.6 has the following rotational viscosities $\gamma_1$ at a defined Δn value:

| Δn | $\gamma_1$ |
|---|---|
| 0.08 ± 0.005 | ≦125 mPa·s |
| 0.09 ± 0.005 | ≦130 mPa·s |
| 0.10 ± 0.005 | ≦135 mPa·s |
| 0.11 ± 0.005 | ≦145 mPa·s |

-continued

| Δn | γ₁ |
|---|---|
| 0.12 ± 0.005 | ≦150 mPa·s |
| 0.13 ± 0.005 | ≦160 mPa·s |
| 0.15 ± 0.01 | ≦170 mPa·s. |

5. A liquid-crystalline medium according to claim 1, which having a clearing point of 70° C.±5° C. and a Δϵ of >−3.6 and ≦−4.4 has the following rotational viscosities $\gamma_1$ at a defined Δn value:

| Δn | γ₁ |
|---|---|
| 0.08 ± 0.005 | ≦140 mPa·s |
| 0.09 ± 0.005 | ≦165 mPa·s |
| 0.10 ± 0.005 | ≦185 mPa·s |
| 0.11 ± 0.005 | ≦190 mPa·s |
| 0.12 ± 0.005 | ≦195 mPa·s |
| 0.13 ± 0.005 | ≦205 mPa·s |
| 0.15 ± 0.01 | ≦220 mPa·s. |

6. A liquid-crystalline medium according to claim 1, which having a clearing point of 70° C.±5° C. and a Δϵ of >−4.4 and ≦−5.6 has the following rotational viscosities $\gamma_1$ at a defined Δn value:

| Δn | γ₁ |
|---|---|
| 0.08 ± 0.005 | ≦185 mPa·s |
| 0.09 ± 0.005 | ≦200 mPa·s |
| 0.10 ± 0.005 | ≦210 mPa·s |
| 0.11 ± 0.005 | ≦220 mPa·s |
| 0.12 ± 0.005 | ≦230 mPa·s |
| 0.13 ± 0.005 | ≦250 mPa·s |
| 0.15 ± 0.01 | ≦270 mPa·s. |

7. A liquid-crystalline medium according to claim 1, which having a clearing point of 90° C.±5° C. and a Δϵ of −3.0±0.6 has the following rotational viscosities $\gamma_1$ at a defined Δn value:

| Δn | γ₁ |
|---|---|
| 0.08 ± 0.005 | ≦160 mPa·s |
| 0.09 ± 0.005 | ≦170 mPa·s |
| 0.10 ± 0.005 | ≦180 mPa·s |
| 0.11 ± 0.005 | ≦190 mPa·s |
| 0.12 ± 0.005 | ≦200 mPa·s |
| 0.13 ± 0.005 | ≦210 mPa·s |
| 0.15 ± 0.01 | ≦220 mPa·s. |

8. A liquid-crystalline medium according to claim 1, which having a clearing point of 90° C.±5° C. and a Δϵ of >−3.6 and ≦−4.4 has the following rotational viscosities $\gamma_1$ at a defined Δn value:

| Δn | γ₁ |
|---|---|
| 0.08 ± 0.005 | ≦185 mPa·s |
| 0.09 ± 0.005 | ≦195 mPa·s |
| 0.10 ± 0.005 | ≦215 mPa·s |
| 0.11 ± 0.005 | ≦215 mPa·s |
| 0.12 ± 0.005 | ≦215 mPa·s |
| 0.13 ± 0.005 | ≦235 mPa·s |
| 0.15 ± 0.01 | ≦250 mPa·s. |

9. A liquid-crystalline medium according to claim 1, which having a clearing point of 90° C.±5° C. and a Δϵ of >−4.4 and ≦−5.6 has the following rotational viscosities $\gamma_1$ at a defined Δn value:

| Δn | γ₁ |
|---|---|
| 0.08 ± 0.005 | ≦280 mPa·s |
| 0.09 ± 0.005 | ≦275 mPa·s |
| 0.10 ± 0.005 | ≦275 mPa·s |
| 0.11 ± 0.005 | ≦275 mPa·s |
| 0.12 ± 0.005 | ≦280 mPa·s. |

10. A liquid-crystalline medium according to claim 1, which has thresholds (capacitive) in the range 1.8-2.3 V.

11. A liquid-crystalline medium according to claim 1, which further comprises at least one compound of the formulae IA, IB and/or II

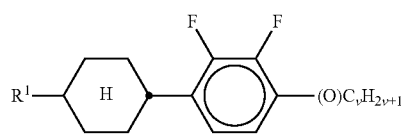

IA

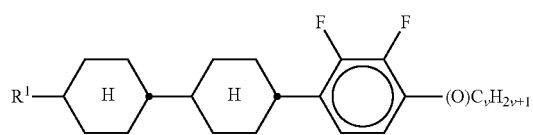

IB

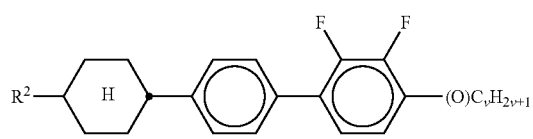

II in which
$R^1$ and $R^2$ each, independently of one another, denote H, an alkyl or alkenyl radical having up to 15 C atoms which is unsubstituted, monosubstituted by CN or $CF_3$ or at least monosubstituted by halogen, in which one or more $CH_2$ groups are each, independently of one another, optionally replaced by —O—, —S—,

,

—C≡C—, —$CF_2$O—, —CO—, —CO—O—, —O—CO— or —O—CO—O— in such a way that O atoms are not linked directly to one another, and
v denotes 1 to 6.

12. A liquid-crystalline medium according to claim 1, which additionally comprises one or more compounds of the formula III

 III in which

R³¹ and R³² each, independently of one another, denote a straight-chain alkyl, alkylalkoxy or alkoxy radical having up to 12 C atoms, and

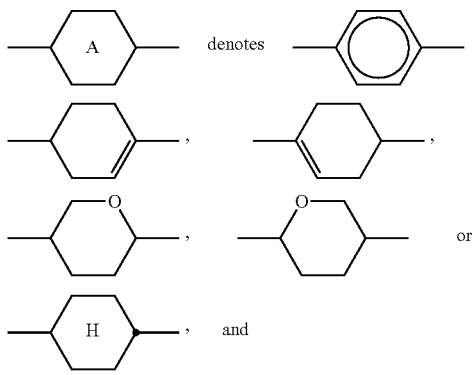

Z denotes a single bond, —O₂H₄—, —CH═CH—, —(CH₂)₄—, —(CH₂)₃O—, —O(CH₂)₃—, —CH═CHCH₂CH₂—, —CH₂CH₂CH═CH—, —CH₂O—, —OCH₂—, —CF₂O—, —OCF₂—, —COO—, —COO—, —C₂F₄—, —CHFCF₂—, —CF═CF—, —CH═CF—, —CF═CH—, or —CH₂—.

13. A liquid-crystalline medium according to claim 11, which comprises one, two, three, four, five or six compounds of the formulae IA, IB and/or II.

14. A liquid-crystalline medium according to claim 11, wherein the proportion of compounds of formulae IA and/or IB in the mixture as a whole is at least 10% by weight.

15. A liquid-crystalline medium according to claim 11, wherein the proportion of compounds of formula II in the mixture as a whole is at least 10% by weight.

16. A liquid-crystalline medium according to claim 12, wherein the proportion of compounds of formula III in the mixture as a whole is at least 5% by weight.

17. A liquid-crystalline medium according to claim 11, which contains 10-40% by weight of one or more compounds of formulae IA and IB and 10-40% by weight of one or more compounds of formula II.

18. An electro-optical display having active-matrix addressing based on the ECB, PA LCD, FFS or the IPS effect, which contains, as dielectric, a liquid-crystalline medium according to claim 1.

19. A liquid-crystalline medium according to claim 1, which further comprises one or more fluorinated terphenyls of formulae T1 to T22

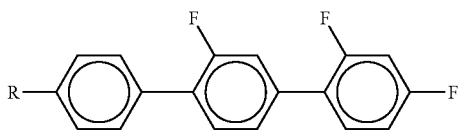 T-1

 T-2

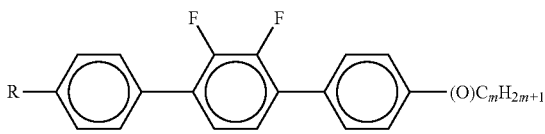 T-3

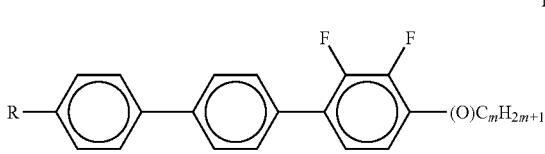 T-4

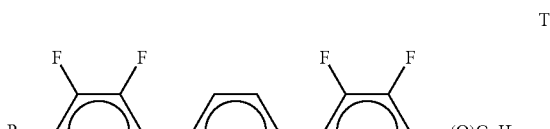 T-5

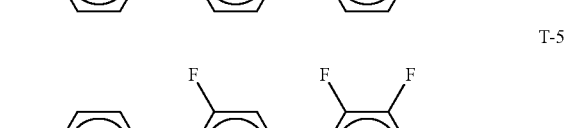 T-6

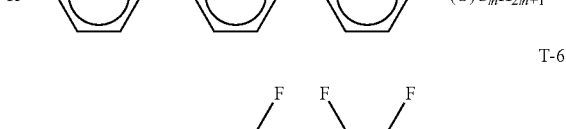 T-7

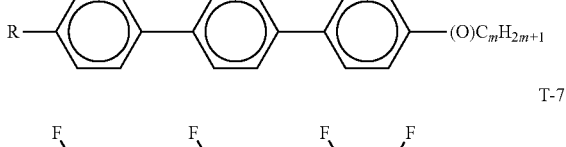 T-9

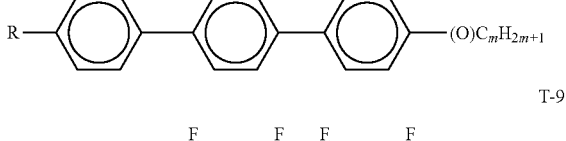 T-10

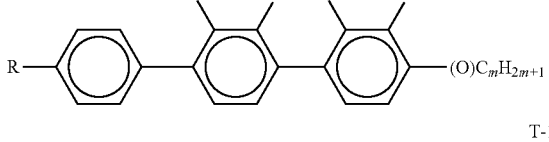 T-11

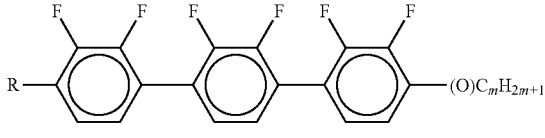

T-12
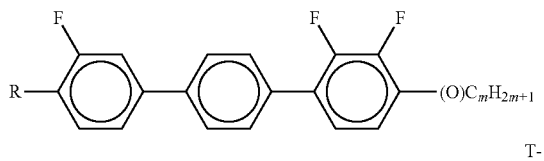

T-13
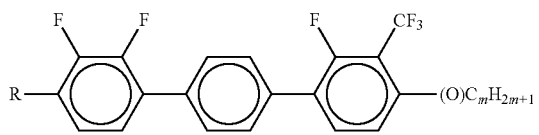

T-14
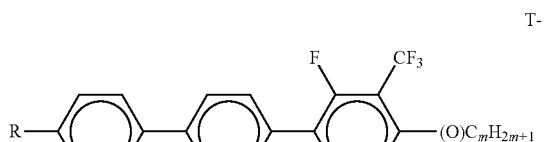

T-15
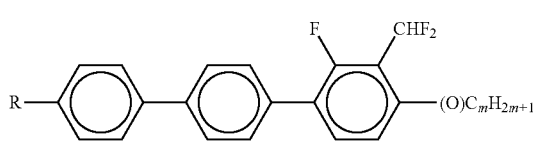

T-16
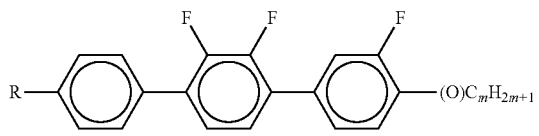

T-17
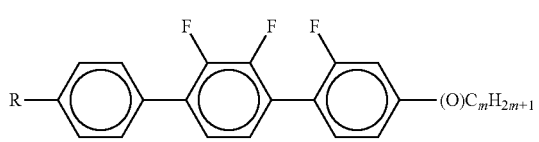

T-18
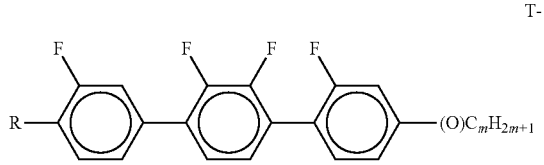

T-19
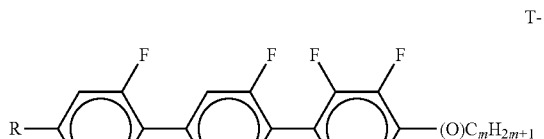

T-20
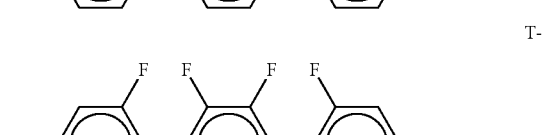

T-21
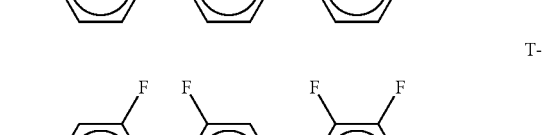

T-22
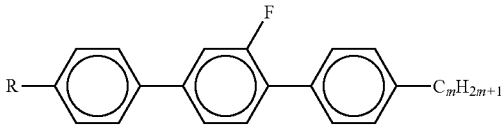

in which

R denotes H, an alkyl or alkenyl radical having up to 15 C atoms which is unsubstituted, monosubstituted by CN or CF$_3$ or at least monosubsti-tuted by halogen, in which one or more CH$_2$ groups are optionally replaced by —O—, —S—,

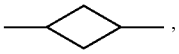

—C≡C—, —OCF$_2$—, —CF$_2$O—, —OC—O— or —O—CO— in such a way that O atoms are not linked directly to one another, and m denotes 1 to 6.

20. A liquid-crystalline medium according to claim 19, which comprises one or more fluorinated terphenyls of formula T2.

21. A liquid-crystalline medium according to claim 19, which comprises one or more fluorinated terphenyls of formulae PYP-n-m and/or PYP-n-Om, PYP-n-m

PYP-n-(O)m
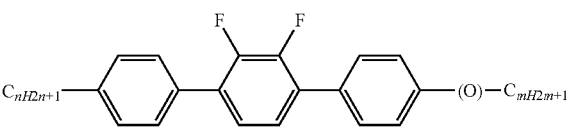

wherein n and m are each independently 1 to 6.

22. A liquid-crystalline medium according to claim 19, which comprises one or more fluorinated terphenyls of formula T22.

23. A liquid-crystalline medium according to claim 19, which comprises the one or more fluorinated terphenyls of formulae T1 to T22 in an amount of 2-30% by weight.

24. A liquid-crystalline medium according to claim 20, which comprises a fluorinated terphenyls of formula T1.

25. A liquid-crystalline medium according to claim 1, which comprises the compound of formula CC-3-V in a concentration of >30%.

26. A liquid-crystalline medium according to claim 1, which further comprises a compound of CC-3-V1 and/or CC-5-V

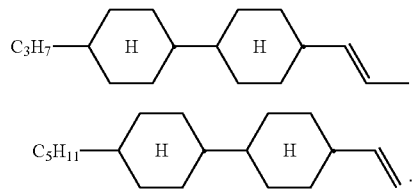 CC-3-V1
and/or
CC-5-V
27. A liquid-crystalline medium according to claim 1, which comprises both compounds of the following formulae
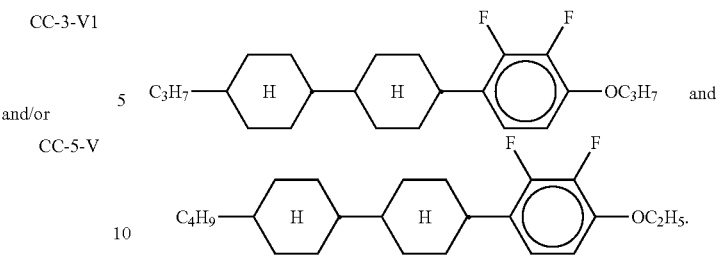

UNITED STATES PATENT AND TRADEMARK OFFICE
CERTIFICATE OF CORRECTION

PATENT NO. : 7,989,035 B2  Page 1 of 1
APPLICATION NO. : 11/631182
DATED : August 2, 2011
INVENTOR(S) : Klasen-Memmer et al.

It is certified that error appears in the above-identified patent and that said Letters Patent is hereby corrected as shown below:

Column 55, Line 31 reads: "Z denotes a single bond, $-O_2H_4-$, $-CH=CH-$," should read -- Z denotes a single bond, $-C_2H_4$, $-CH=CH-$, --

Column 55, Line 35 reads: "$-COO-$, $-COO-$, $-C_2F_4$, $-CHFCF_2$, or" should read -- $-COO$, $OCO$, $C_2F_4$, $-CHFCF_2$, --

Signed and Sealed this
Sixth Day of March, 2012

David J. Kappos
*Director of the United States Patent and Trademark Office*

UNITED STATES PATENT AND TRADEMARK OFFICE
CERTIFICATE OF CORRECTION

PATENT NO. : 7,989,035 B2
APPLICATION NO. : 11/631182
DATED : August 2, 2011
INVENTOR(S) : Klasen-Memmer et al.

It is certified that error appears in the above-identified patent and that said Letters Patent is hereby corrected as shown below:

Column 55, Line 2 reads: " 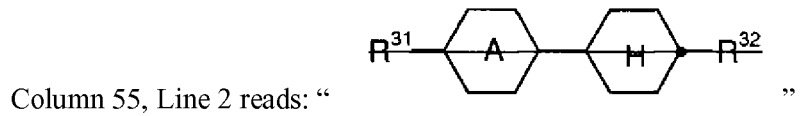 "

should read -- 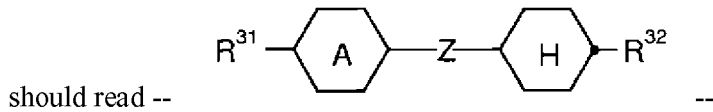 --

Signed and Sealed this
Tenth Day of July, 2012

David J. Kappos
*Director of the United States Patent and Trademark Office*